US012200680B2

(12) United States Patent
Taherzadeh Boroujeni et al.

(10) Patent No.: US 12,200,680 B2
(45) Date of Patent: Jan. 14, 2025

(54) BEAM-BASED PRIORITY OF SEMI-STATICALLY CONFIGURED COMMUNICATIONS

(71) Applicant: QUALCOMM Incorporated, San Diego, CA (US)

(72) Inventors: Mahmoud Taherzadeh Boroujeni, San Diego, CA (US); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 273 days.

(21) Appl. No.: 17/453,694

(22) Filed: Nov. 5, 2021

(65) Prior Publication Data

US 2023/0143713 A1 May 11, 2023

(51) Int. Cl.
*H04W 72/044* (2023.01)
*H04W 72/23* (2023.01)
*H04W 72/56* (2023.01)

(52) U.S. Cl.
CPC ......... *H04W 72/046* (2013.01); *H04W 72/23* (2023.01); *H04W 72/56* (2023.01)

(58) Field of Classification Search
CPC .... H04W 72/046; H04W 72/23; H04W 72/56
See application file for complete search history.

(56) References Cited

U.S. PATENT DOCUMENTS

| 2019/0313437 | A1* | 10/2019 | Jung | H04W 72/1273 |
| 2020/0274657 | A1* | 8/2020 | Deenoo | H04L 5/0053 |
| 2020/0304230 | A1* | 9/2020 | Papasakellariou | H04L 1/0006 |
| 2021/0314927 | A1* | 10/2021 | Noh | H04W 72/56 |

OTHER PUBLICATIONS

Nokia, Nokia Shanghai Bell, Enhancements on Multi-beam Operation, 3GPP TSG RAN WG1 #106-bis-e, e-Meeting, Oct. 11-Oct. 19, 2021, R1-2109870. (Year: 2021).*
Spreadtrum Communications, Discussion on enhancements on beam management for multi-TRP, 3GPP TSG RAN WG1 #106bis-e , e-Meeting, Oct. 11-19, 2021, R1-2108898. (Year: 2021).*
ZTE, Discussion on Multi-TRP HST enhancements, 3GPP TSG RAN WG1 #106bis-e, e-Meeting, Oct. 11-19, 2021, R1-2108874 (Year: 2021).*
International Search Report and Written Opinion—PCT/US2022/077417—ISA/EPO—Dec. 16, 2022.

(Continued)

*Primary Examiner* — Shailendra Kumar
(74) *Attorney, Agent, or Firm* — Harrity & Harrity, LLP

(57) ABSTRACT

Various aspects of the present disclosure generally relate to wireless communication. In some aspects, a user equipment (UE) may receive a first configuration for a first set of semi-statically configured communications. The UE may receive a second configuration for a second set of semi-statically configured communications, wherein a first communication occasion of the first configuration at least partially overlaps with a second communication occasion of the second configuration. The UE may transmit or receive a communication, via the first communication occasion or the second communication occasion, based at least in part on a beam-based priority of the first configuration or the second configuration. Numerous other aspects are described.

30 Claims, 14 Drawing Sheets

(56) References Cited

OTHER PUBLICATIONS

Nokia, et al., "Enhancements on Multi-Beam Operation", 3GPP TSG RAN WG1 #106-bis-e, R1-2109870, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 11, 2021-Oct. 19, 2021, 30 Pages, Oct. 1, 2021, XP052058799, section 1, section 2.1, section 2.2, section 2.3.

Spreadtrum Communications: "Discussion on Enhancements on Beam Management for Multi-TRP", 3GPP TSG RAN WG1 #106bis-e, R1-2108898, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 11, 2021-Oct. 19, 2021, 5 Pages, Oct. 1, 2021, XP052057910, the whole document.

ZTE: "Discussion on Multi-TRP HST Enhancements", 3GPP TSG RAN WG1 #106bis-e, R1-2108874, 3rd Generation Partnership Project (3GPP), Mobile Competence Centre, 650, Route Des Lucioles, F-06921 Sophia-Antipolis Cedex, France, vol. Ran WG1, No. e-Meeting, Oct. 11, 2021-Oct. 19, 2021, 7 Pages, Oct. 1, 2021 (Oct. 1, 2021), XP052057750, the whole document.

\* cited by examiner

BEAM-BASED PRIORITY OF SEMI-STATICALLY CONFIGURED COMMUNICATIONS

FIELD OF THE DISCLOSURE

Aspects of the present disclosure generally relate to wireless communication and to techniques and apparatuses for beam-based priority of semi-statically configured communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a first configuration for a first set of semi-statically configured communications. The method may include receiving a second configuration for a second set of semi-statically configured communications, where a first communication occasion of the first configuration at least partially overlaps with a second communication occasion of the second configuration. The method may include transmitting or receiving a communication, via the first communication occasion or the second communication occasion, based at least in part on a beam-based priority of the first configuration or the second configuration.

Some aspects described herein relate to a method of wireless communication performed by a UE. The method may include receiving multiple configurations associated with multiple transmission configuration information (TCI) states. The method may include receiving an indication of a TCI state, of the multiple TCI states, that is associated with a configuration of the multiple configurations.

Some aspects described herein relate to a method of wireless communication performed by a base station. The method may include transmitting, to a UE, a first configuration for a first set of semi-statically configured communications. The method may include transmitting, to the UE, a second configuration for a second set of semi-statically configured communications, where a first communication occasion of the first configuration at least partially overlaps with a second communication occasion of the second configuration. The method may include receiving or transmitting a communication, via the first communication occasion or the second communication occasion, based at least in part on a beam-based priority of the first configuration or the second configuration.

Some aspects described herein relate to a method of wireless communication performed by a base station. The method may include transmitting, to a UE, multiple configurations associated with multiple TCI states. The method may include transmitting, to the UE, an indication of a TCI state, of the multiple TCI states, that is associated with a configuration of the multiple configurations.

Some aspects described herein relate to a UE for wireless communication. The UE may include a memory and one or more processors coupled to the memory. The one or more processors may be configured to receive a first configuration for a first set of semi-statically configured communications. The one or more processors may be configured to receive a second configuration for a second set of semi-statically configured communications. The one or more processors may be configured to transmit or receive a communication, via the first communication occasion or the second communication occasion, based at least in part on a beam-based priority of the first configuration or the second configuration.

Some aspects described herein relate to a UE for wireless communication. The UE may include a memory and one or more processors coupled to the memory. The one or more processors may be configured to receive multiple configurations associated with multiple TCI states. The one or more processors may be configured to receive an indication of a TCI state, of the multiple TCI states, that is associated with a configuration of the multiple configurations.

Some aspects described herein relate to a base station for wireless communication. The base station may include a memory and one or more processors coupled to the memory. The one or more processors may be configured to transmit, to a UE, a first configuration for a first set of semi-statically configured communications. The one or more processors may be configured to transmit, to the UE, a second configuration for a second set of semi-statically configured communications. The one or more processors may be configured to receive or transmit a communication, via the first communication occasion or the second communication occasion, based at least in part on a beam-based priority of the first configuration or the second configuration.

Some aspects described herein relate to a base station for wireless communication. The base station may include a memory and one or more processors coupled to the memory. The one or more processors may be configured to transmit, to a UE, multiple configurations associated with multiple TCI states. The one or more processors may be configured to transmit, to the UE, an indication of a TCI state, of the multiple TCI states, that is associated with a configuration of the multiple configurations.

Some aspects described herein relate to a non-transitory computer-readable medium that stores a set of instructions for wireless communication by a UE. The set of instructions, when executed by one or more processors of the UE, may cause the UE to receive a first configuration for a first set of semi-statically configured communications. The set of instructions, when executed by one or more processors of the UE, may cause the UE to receive a second configuration for a second set of semi-statically configured communications. The set of instructions, when executed by one or more processors of the UE, may cause the UE to transmit or receive a communication, via the first communication occasion or the second communication occasion, based at least in part on a beam-based priority of the first configuration or the second configuration.

Some aspects described herein relate to a non-transitory computer-readable medium that stores a set of instructions for wireless communication by a UE. The set of instructions, when executed by one or more processors of the UE, may cause the UE to receive multiple configurations associated with multiple TCI states. The set of instructions, when executed by one or more processors of a UE, may cause the UE to receive an indication of a TCI state, of the multiple TCI states, that is associated with a configuration of the multiple configurations.

Some aspects described herein relate to a non-transitory computer-readable medium that stores a set of instructions for wireless communication by a base station. The set of instructions, when executed by one or more processors of the base station, may cause the base station to transmit, to a UE, a first configuration for a first set of semi-statically configured communications. The set of instructions, when executed by one or more processors of the base station, may cause the base station to transmit, to the UE, a second configuration for a second set of semi-statically configured communications. The set of instructions, when executed by one or more processors of the base station, may cause the base station to receive or transmit a communication, via the first communication occasion or the second communication occasion, based at least in part on a beam-based priority of the first configuration or the second configuration.

Some aspects described herein relate to a non-transitory computer-readable medium that stores a set of instructions for wireless communication by a base station. The set of instructions, when executed by one or more processors of the base station, may cause the base station to transmit, to a UE, multiple configurations associated with multiple TCI states. The set of instructions, when executed by one or more processors of the base station, may cause the base station to transmit, to the UE, an indication of a TCI state, of the multiple TCI states, that is associated with a configuration of the multiple configurations.

Some aspects described herein relate to an apparatus for wireless communication. The apparatus may include means for receiving a first configuration for a first set of semi-statically configured communications. The apparatus may include means for receiving a second configuration for a second set of semi-statically configured communications, where a first communication occasion of the first configuration at least partially overlaps with a second communication occasion of the second configuration. The apparatus may include means for transmitting or receiving a communication, via the first communication occasion or the second communication occasion, based at least in part on a beam-based priority of the first configuration or the second configuration.

Some aspects described herein relate to an apparatus for wireless communication. The apparatus may include means for receiving multiple configurations associated with multiple TCI states. The apparatus may include means for receiving an indication of a TCI state, of the multiple TCI states, that is associated with a configuration of the multiple configurations.

Some aspects described herein relate to an apparatus for wireless communication. The apparatus may include means for transmitting, to a UE, a first configuration for a first set of semi-statically configured communications. The apparatus may include means for transmitting, to the UE, a second configuration for a second set of semi-statically configured communications, where a first communication occasion of the first configuration at least partially overlaps with a second communication occasion of the second configuration. The apparatus may include means for receiving or transmitting a communication, via the first communication occasion or the second communication occasion, based at least in part on a beam-based priority of the first configuration or the second configuration.

Some aspects described herein relate to an apparatus for wireless communication. The apparatus may include means for transmitting, to a UE, multiple configurations associated with multiple TCI states. The apparatus may include means for transmitting, to the UE, an indication of a TCI state, of the multiple TCI states, that is associated with a configuration of the multiple configurations.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
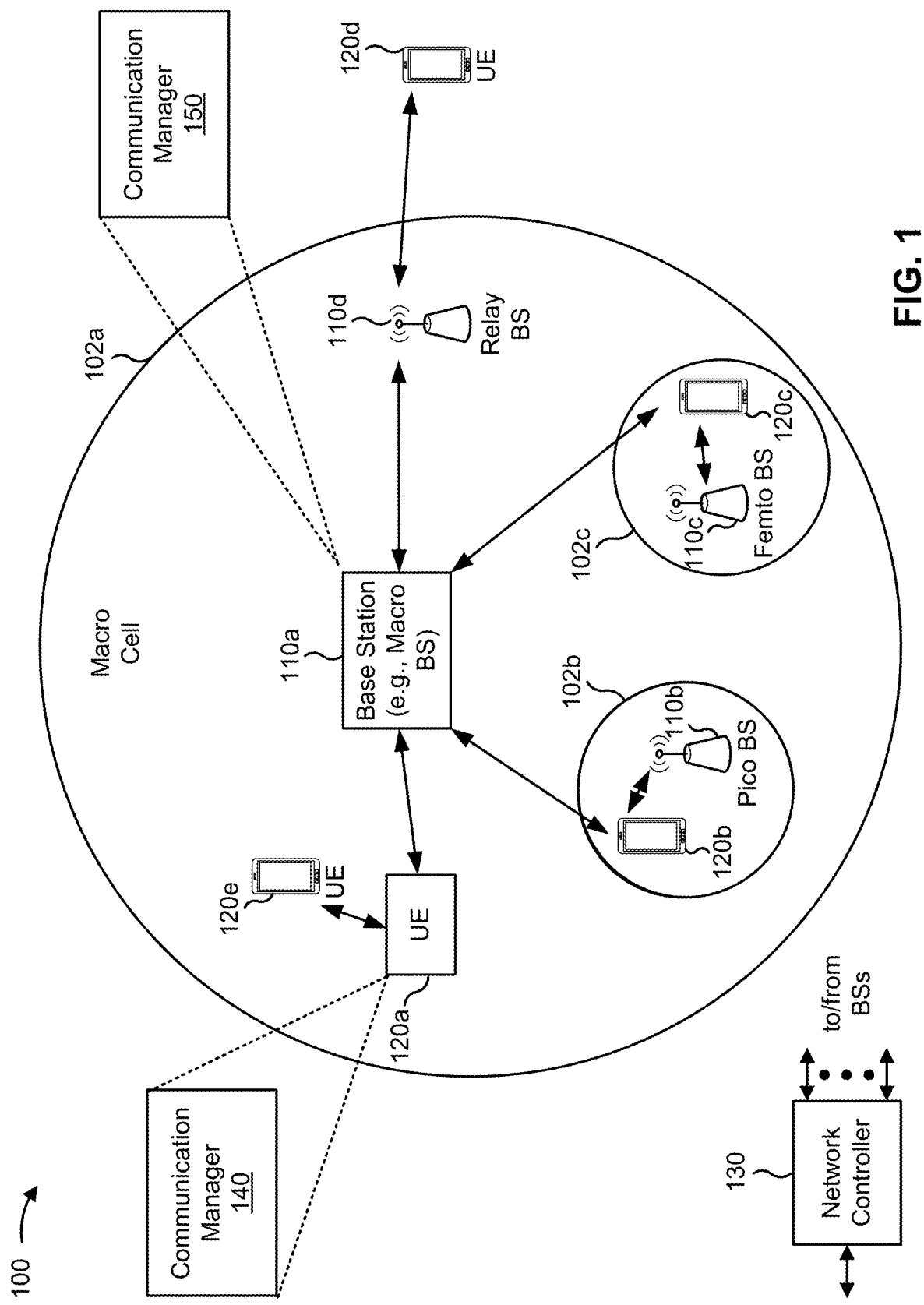
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a first configuration for a first set of semi-statically configured communications; receive a second configuration for a second set of semi-statically configured communications, wherein a first communication occasion of the first configuration at least partially overlaps with a second communication occasion of the second configuration; and transmit or receive a communication, via the first communication occasion or the second communication occasion, based at least in part on a beam-based priority of the first configuration or the second configuration. Additionally, or alternatively, the communication manager 140 may perform one or more other operations described herein.

In some aspects, the UE 120 may include a communication manager 140. As described in more detail elsewhere herein, the communication manager 140 may receive multiple configurations associated with multiple TCI states; and receive an indication of a TCI state, of the multiple TCI states, that is associated with a configuration of the multiple configurations. Additionally, or alternatively, the communication manager 140 may perform one or more other operations described herein.

In some aspects, the base station 110 may include a communication manager 150. As described in more detail elsewhere herein, the communication manager 150 may transmit, to a UE, a first configuration for a first set of semi-statically configured communications; transmit, to the UE, a second configuration for a second set of semi-statically configured communications, wherein a first communication occasion of the first configuration at least partially overlaps with a second communication occasion of the second configuration; and receive or transmit a communication, via the first communication occasion or the second communication occasion, based at least in part on a beam-based priority of the first configuration or the second configuration. Additionally, or alternatively, the communication manager 150 may perform one or more other operations described herein.

In some aspects, the base station 110 may include a communication manager 150. As described in more detail elsewhere herein, the communication manager 150 may transmit, to a UE, multiple configurations associated with multiple TCI states; and transmit, to the UE, an indication of a TCI state, of the multiple TCI states, that is associated with a configuration of the multiple configurations. Additionally, or alternatively, the communication manager 150 may perform one or more other operations described herein.

As indicated above, FIG. 1 is provided as an example. Other examples may differ from what is described with regard to FIG. 1.

Figure 2:
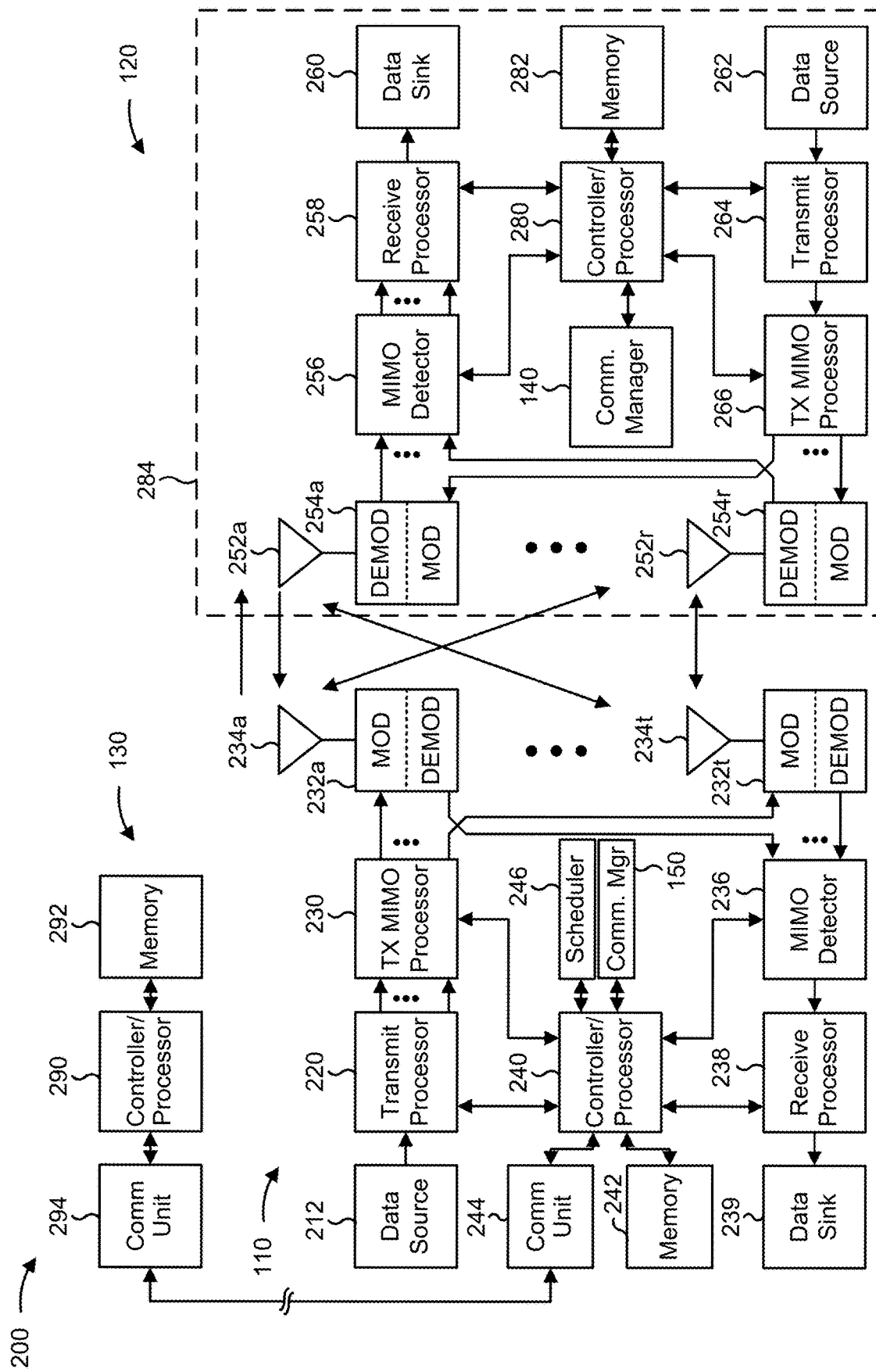
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-13).

The controller/processor 240 of the base station 110, the controller/processor 280 of the UE 120, and/or any other component(s) of FIG. 2 may perform one or more techniques associated with beam-based priority of semi-statically configured communications, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, the UE includes means for receiving a first configuration for a first set of semi-statically configured communications; means for receiving a second configuration for a second set of semi-statically configured communications, wherein a first communication occasion of the first configuration at least partially overlaps with a second communication occasion of the second configuration; and/or means for transmitting or receiving a communication, via the first communication occasion or the second communication occasion, based at least in part on a beam-based priority of the first configuration or the second configuration. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE includes means for receiving multiple configurations associated with multiple TCI states; and/or means for receiving an indication of a TCI state, of the multiple TCI states, that is associated with a configuration of the multiple configurations. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting, to a UE, a first configuration for a first set of semi-statically configured communications; means for transmitting, to the UE, a second configuration for a second set of semi-statically configured communications, wherein a first communication occasion of the first configuration at least partially overlaps with a second communication occasion of the second configuration; and/or means for receiving or transmitting a communication, via the first communication occasion or the second communication occasion, based at least in part on a beam-based priority of the first configuration or the second configuration. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the base station includes means for transmitting, to a UE, multiple configurations associated with multiple TCI states; and/or means for transmitting, to the UE, an indication of a TCI state, of the multiple TCI states, that is associated with a configuration of the multiple configurations. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
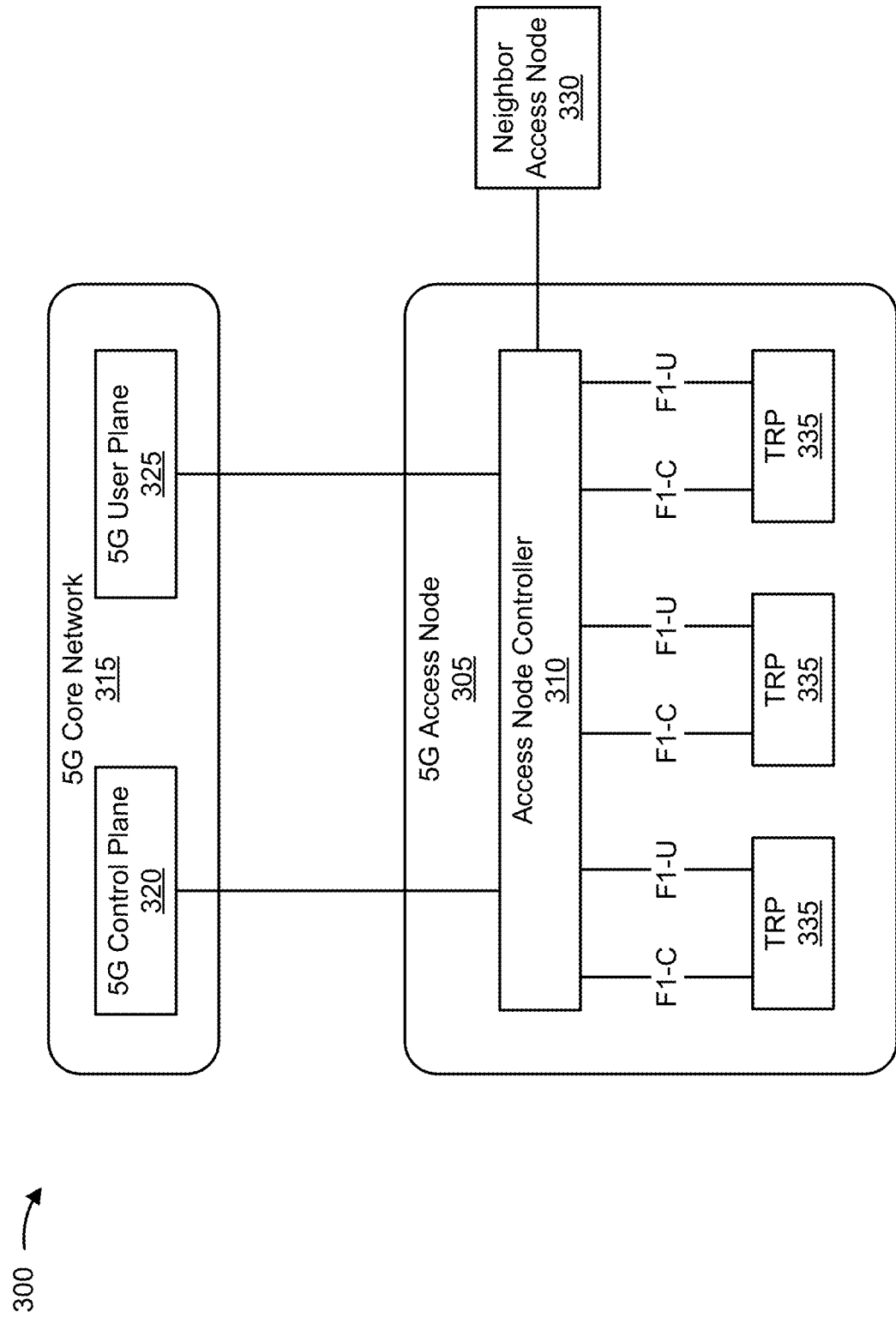
FIG. 3 illustrates an example logical architecture of a distributed radio access network (RAN), in accordance with the present disclosure.

FIG. 3 illustrates an example logical architecture of a distributed RAN 300, in accordance with the present disclosure.

A 5G access node 305 may include an access node controller 310. The access node controller 310 may be a central unit (CU) of the distributed RAN 300. In some aspects, a backhaul interface to a 5G core network 315 may terminate at the access node controller 310. The 5G core network 315 may include a 5G control plane component 320 and a 5G user plane component 325 (e.g., a 5G gateway), and the backhaul interface for one or both of the 5G control plane and the 5G user plane may terminate at the access node controller 310. Additionally, or alternatively, a backhaul interface to one or more neighbor access nodes 330 (e.g., another 5G access node 305 and/or an LTE access node) may terminate at the access node controller 310.

The access node controller 310 may include and/or may communicate with one or more TRPs 335 (e.g., via an F1 Control (F1-C) interface and/or an F1 User (F1-U) interface). A TRP 335 may be a distributed unit (DU) of the distributed RAN 300. In some aspects, a TRP 335 may correspond to a base station 110 described above in connection with FIG. 1. For example, different TRPs 335 may be included in different base stations 110. Additionally, or alternatively, multiple TRPs 335 may be included in a single base station 110. In some aspects, a base station 110 may include a CU (e.g., access node controller 310) and/or one or more DUs (e.g., one or more TRPs 335). In some cases, a TRP 335 may be referred to as a cell, a panel, an antenna array, or an array.

A TRP 335 may be connected to a single access node controller 310 or to multiple access node controllers 310. In some aspects, a dynamic configuration of split logical functions may be present within the architecture of distributed RAN 300. For example, a packet data convergence protocol (PDCP) layer, a radio link control (RLC) layer, and/or a medium access control (MAC) layer may be configured to terminate at the access node controller 310 or at a TRP 335.

In some aspects, multiple TRPs 335 may transmit communications (e.g., the same communication or different communications) in the same transmission time interval (TTI) (e.g., a slot, a mini-slot, a subframe, or a symbol) or different TTIs using different quasi-co-location (QCL) relationships (e.g., different spatial parameters, different transmission configuration indicator (TCI) states, different precoding parameters, and/or different beamforming parameters). In some aspects, a TCI state may be used to indicate one or more QCL relationships. A TRP 335 may be configured to individually (e.g., using dynamic selection) or jointly (e.g., using joint transmission with one or more other TRPs 335) serve traffic to a UE 120.

As indicated above, FIG. 3 is provided as an example. Other examples may differ from what was described with regard to FIG. 3.

Figure 4:
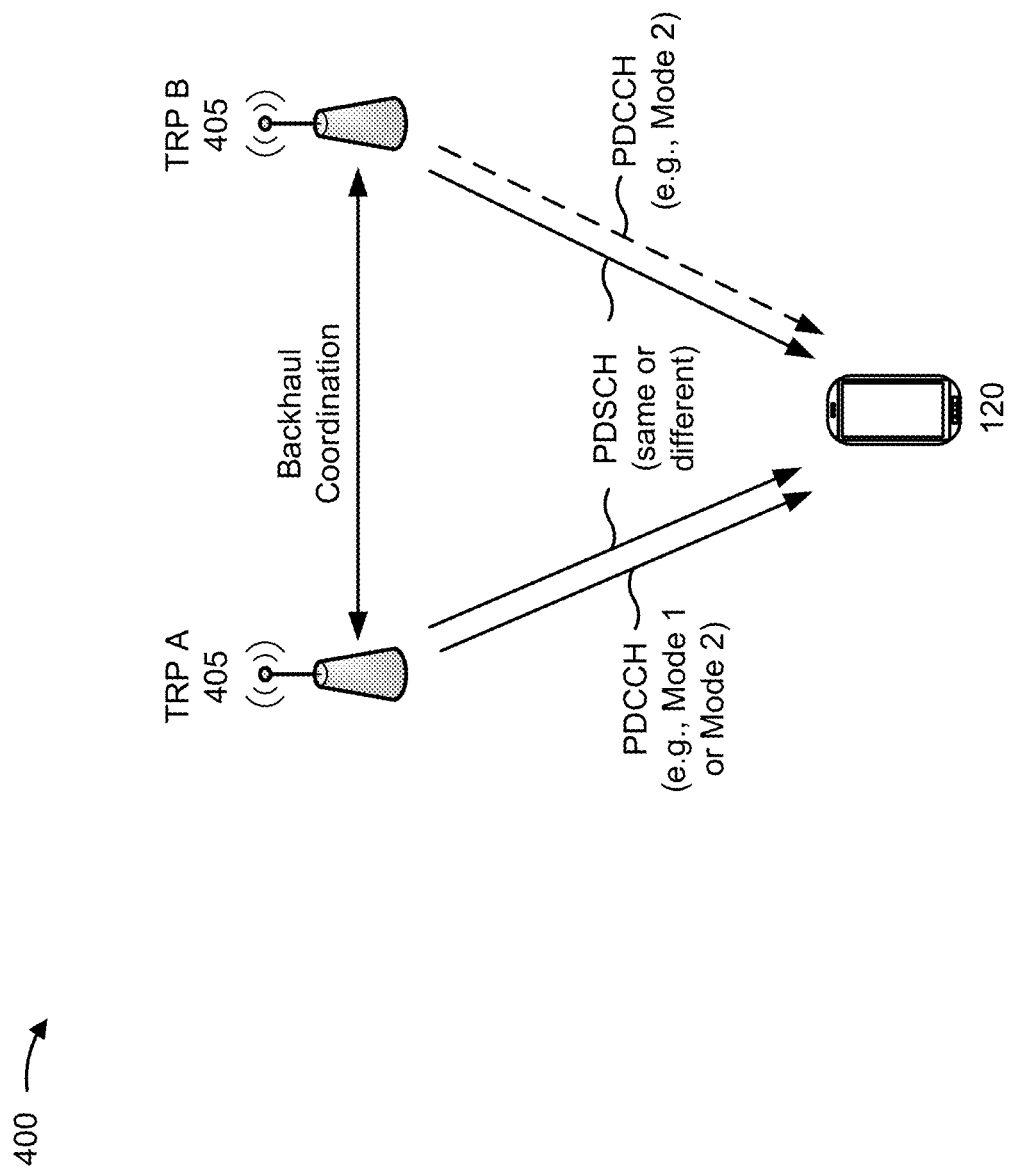
FIG. 4 is a diagram illustrating an example of multiple transmission reception point (multi-TRP) communication, in accordance with the present disclosure.

FIG. 4 is a diagram illustrating an example 400 of multi-TRP communication (sometimes referred to as multi-panel communication), in accordance with the present disclosure. As shown in FIG. 4, multiple TRPs 405 may communicate with the same UE 120. A TRP 405 may correspond to a TRP 335 described above in connection with FIG. 3.

The multiple TRPs 405 (shown as TRP A and TRP B) may communicate with the same UE 120 in a coordinated manner (e.g., using coordinated multipoint transmissions) to improve reliability and/or increase throughput. The TRPs 405 may coordinate such communications via an interface between the TRPs 405 (e.g., a backhaul interface and/or an access node controller 310). The interface may have a smaller delay and/or higher capacity when the TRPs 405 are co-located at the same base station 110 (e.g., when the TRPs 405 are different antenna arrays or panels of the same base station 110), and may have a larger delay and/or lower capacity (as compared to co-location) when the TRPs 405 are located at different base stations 110. The different TRPs 405 may communicate with the UE 120 using different QCL relationships (e.g., different TCI states), different demodulation reference signal (DMRS) ports, and/or different layers (e.g., of a multi-layer communication).

In a first multi-TRP transmission mode (e.g., Mode 1), a single physical downlink control channel (PDCCH) may be used to schedule downlink data communications for a single physical downlink shared channel (PDSCH). In this case, multiple TRPs 405 (e.g., TRP A and TRP B) may transmit communications to the UE 120 on the same PDSCH. For example, a communication may be transmitted using a single codeword with different spatial layers for different TRPs 405 (e.g., where one codeword maps to a first set of layers transmitted by a first TRP 405 and maps to a second set of layers transmitted by a second TRP 405). As another example, a communication may be transmitted using multiple codewords, where different codewords are transmitted by different TRPs 405 (e.g., using different sets of layers). In either case, different TRPs 405 may use different QCL relationships (e.g., different TCI states) for different DMRS ports corresponding to different layers. For example, a first TRP 405 may use a first QCL relationship or a first TCI state for a first set of DMRS ports corresponding to a first set of layers, and a second TRP 405 may use a second (different) QCL relationship or a second (different) TCI state for a second (different) set of DMRS ports corresponding to a second (different) set of layers. In some aspects, a TCI state in downlink control information (DCI) (e.g., transmitted on the PDCCH, such as DCI format 1_0 or DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 405, and a second PDCCH may schedule a second codeword to be transmitted by a second TRP 405. Furthermore, first DCI (e.g., transmitted by the first TRP 405) may schedule a first PDSCH communication associated with a first set of DMRS ports with a first QCL relationship (e.g., indicated by a first TCI state) for the first TRP 405, and second DCI (e.g., transmitted by the second TRP 405) may schedule a second PDSCH communication associated with a second set of DMRS ports with a second QCL relationship (e.g., indicated by a second TCI state) for the second TRP 405. In this case, DCI (e.g., having DCI format 1_0 or DCI format 1_1) may indicate a corresponding TCI state for a TRP 405 corresponding to the DCI. The TCI field of a DCI indicates the corresponding TCI state (e.g., the TCI field of the first DCI indicates the first TCI state and the TCI field of the second DCI indicates the second TCI state).

As indicated above, FIG. 4 is provided as an example. Other examples may differ from what is described with respect to FIG. 4.

In some networks, a base station or other network device may transmit a configuration grant (CG) for one or more uplink communications and/or a configuration for semi-persistent scheduling (SPS). Priority of the CG and/or the SPS may be based at least in part on an SPS identification or another identification. A UE may communicate via a prioritized CG or SPS when in conflict (e.g., partial or complete overlap) with another CG or SPS. The base station or other network device may also transmit separate commands (e.g., a MAC control element (CE)) that are different from DCI associated with an SPS or CG. For example, the network may transmit an indication of a beam for control or other procedures.

The base station or other network device may prefer to transmit and/or receive on a preferred beam rather than on a previously indicated beam for the CG or SPS. For example, the base station may conserve power and/or processing resources based at least in part on receiving a communication via a same beam on which the base station communicates with one or more other devices and/or on a same beam with which the base station transmits or receives control information from the UE. However, signaling a change to a different beam (e.g., associated with a TCI state) may cause delay and may consume communication and network resources to communicate the signaling to change to the different beam.

In some aspects described herein, a UE may assign priority to semi-statically configured communications (e.g., SPS and/or CG) based at least in part on an indication within a communication protocol (e.g., a standard specification) or based at least in part on a configuration (e.g., by a base station) to be dependent on an associated beam. For example, when a unified beam has been indicated and/or configured for uplink and downlink, semi-statically configured communications that are quasi-co-located (QCLed) with the unified beam may have priority over other semi-statically configured communications that are not QCLed with the unified beam. In some aspects, semi-statically configured communications that are QCLed with a DL control beam may have higher priority over other semi-statically configured communications. In some aspects, semi-statically configured communications that are QCLed with a physical downlink control channel (PDCCH) may have higher priority over other semi-statically configured communications in occasions located in time slots and/or OFDM symbols that contain monitoring occasions of the PDCCH. In some aspects, the UE may selectively apply beam-based priority of semi-statically configured communications based at least in part on a frequency range (e.g., FR1 or FR2, among other examples), a frequency band, and/or subcarrier spacing associated with the semi-statically configured communications. For example, the UE may perform beam-based priority of semi-statically configured communications when operating in FR2 and may not perform beam-based priority of semi-statically configured communications when operating in FR1.

Based at least in part on the UE performing beam-based prioritization of semi-statically configured communications, the UE may avoid or reduce delay to configure the semi-statically configured communications with different priorities and may conserve communication and network resources to indicate changed priorities of the semi-statically configured communications.

Figure 5:
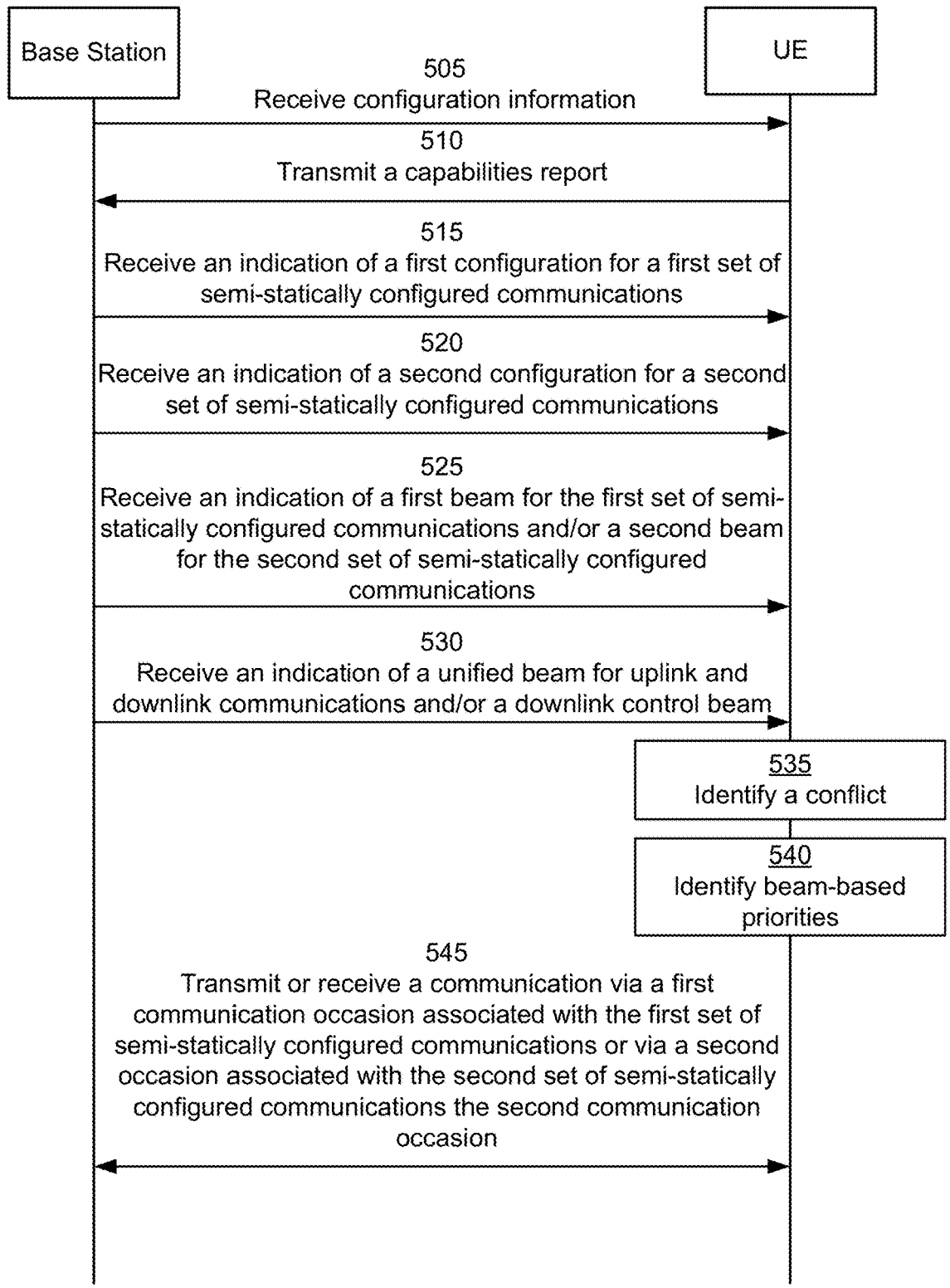
FIG. 5 is a diagram illustrating an example associated with beam-based priority of semi-statically configured communications, in accordance with the present disclosure.

FIG. 5 is a diagram illustrating an example 500 associated with beam-based priority of semi-statically configured communications, in accordance with the present disclosure. As shown in FIG. 5, a base station (e.g., base station 110) may communicate with a UE (e.g., UE 120). In some aspects, the base station and the UE may be part of a wireless network (e.g., wireless network 100). The UE and the base station may have established a wireless connection prior to operations shown in FIG. 5. The base station and the UE may be associated with one or more TRPs through which the base station and the UE may communicate.

As shown by reference number 505, the base station may transmit, and the UE may receive, configuration information. In some aspects, the UE may receive the configuration information via one or more radio resource control (RRC) signaling, one or more MAC CEs, and/or DCI, among other examples. In some aspects, the configuration information may include an indication of one or more configuration parameters (e.g., already known to the UE) for selection by the UE, or explicit configuration information for the UE to use to configure the UE, among other examples.

In some aspects, the configuration information may indicate that the UE is to perform beam-based prioritization of semi-statically configured communications. In some aspects, the configuration information may indicate priorities of different beams and/or may indicate procedures and/or parameters for identifying priorities of the different beams, among other examples.

The UE may configure itself based at least in part on the configuration information. In some aspects, the UE may be configured to perform one or more operations described herein based at least in part on the configuration information.

As shown by reference number 510, the UE may transmit, and the base station may receive, a capabilities report. The capabilities report may indicate UE support for beam-based priority of semi-statically configured communications.

As shown by reference number 515, the UE may receive an indication of a first configuration for a first set of semi-statically configured communications. In some aspects, the first set of semi-statically configured communications may include a CG or SPS.

In some aspects, the first configuration indicates multiple TCI states (e.g., beams indicated via TCI states and/or QCL information) and associated transmission parameters that may be used for communication using the first set of semi-statically configured communications. For example, each of the multiple TCI states may be associated with transmission parameters for using the semi-statically configured communications, such as time resources, frequency resources, modulation and coding schemes (MCSs), resource sizes, and/or repetition numbers, among other examples. In some aspects, the first configuration may indicate an active TCI state that is initially active for the first configuration.

As shown by reference number 520, the UE may receive an indication of a second configuration for a second set of semi-statically configured communications. In some aspects, the second set of semi-statically configured communications may include a CG or SPS.

In some aspects, the second configuration indicates multiple TCI states (e.g., beams indicated via TCI states and/or QCL information) and associated transmission parameters that may be used for communication using the second set of semi-statically configured communications. For example, each of the multiple TCI states may be associated with transmission parameters for using the semi-statically configured communications, such as time resources, frequency resources, MCSs, resource sizes, and/or repetition numbers, among other examples. In some aspects, the second configuration may indicate an active TCI state that is initially active for the second configuration.

As shown by reference number 525, the UE may receive an indication of a first beam for the first set of semi-statically configured communications and/or a second beam for the second set of semi-statically configured communications. In some aspects, the UE may receive the indication of the first beam and/or the second beam via an indication of a first TCI state (e.g., QCL information) and/or a second TCI state (e.g., QCL information). For example, the UE may receive the indication of the first TCI state and/or the second TCI state via an indication of a beam switching command associated with a control beam and/or a configured time pattern for switching between the multiple TCI states, among other examples. The UE may receive the indication to activate the first TCI state (e.g., the first beam) and/or the second TCI state (e.g., the second beam) via group-common DCI, UE-specific DCI, one or more group-common MAC CEs, or one or more UE-specific MAC CEs, among other examples.

In some aspects, the first beam may be associated with a time and/or frequency resource of a first communication occasion of the first configuration, an MCS of the first communication occasion, a resource size of the first communication occasion, and/or a repetition number of the first communication occasion. Additionally, or alternatively, the second beam may be associated with a time and/or frequency resource of a second communication occasion of the second configuration, an MCS of the second communication occasion, a resource size of the second communication occasion, and/or a repetition number of the second communication occasion.

In some aspects, the MCS of the first communication occasion or the second communication occasion may be based at least in part on previously transmitted reports from the UE (e.g., a channel state information (CSI) report), channel measurements (e.g., measurements of CSI and/or synchronization signal blocks (SSBs)), dynamic signaling from a base station (e.g., via DCI and/or one or more MAC CEs), or an amount of time after activation of an associated active TCI state (e.g., with the MCS applying to the first communication occasion based at least in part on satisfying a threshold amount of time after receiving the indication of the first beam or the second beam).

As shown by reference number 530, the UE may receive an indication of a unified beam for uplink and downlink communications and/or a downlink control beam. In some aspects, the unified beam may be associated with a same and/or reciprocal TCI state and/or QCL information. For example, the unified beam may be used to transmit and receive communications from the base station such that uplink signaling propagates along substantially a same path as downlink signaling in an opposite direction. In some aspects, the UE may be configured to provide higher priority to semi-statically configured communication occasions associated with beams that have QCL information associated with the unified beam.

In some aspects, the UE may receive an indication of the downlink control channel beam (e.g., a physical downlink control channel (PDCCH) beam) via dynamic signaling. In some aspects, the UE may be configured to prioritize (e.g., assign higher priority to) semi-statically configured communication occasions associated with beams that have QCL information associated with the downlink control beam. In some aspects, the UE may be configured to prioritize semi-statically configured communication occasions associated with beams that have QCL information associated with the downlink control beam based at least in part on the semi-statically configured communication occasions being within a same communication protocol based time unit (e.g., a slot and/or a symbol, among other examples) from a downlink control channel monitoring occasion.

As shown by reference number 535, the UE may identify a conflict. For example, the UE may identify a first communication occasion of the first configuration that at least partially overlaps with a second communication occasion of the second configuration. The first communication occasion and the second communication occasion may at least partially overlap based at least in part on the first communication occasion and the second communication occasion completely overlapping in time and/or frequency, and/or the first communication occasion and the second communication occasion partially overlapping in time and/or frequency.

As shown by reference number 540, the UE may identify beam-based priorities. The UE may identify the beam-based priorities for selecting one of the first communication occasion or the second communication occasion to use to communicate with the base station. In some aspects, the UE may identify the beam-based priorities, as described herein, to determine whether to transmit or receive a communication via the first communication occasion or via the second communication occasion. For example, the UE may prioritize the first communication occasion based at least in part on the first communication occasion being configured with quasi-co-location information that is associated with the unified beam, the first communication occasion being configured with quasi-co-location information that is associated with the downlink control channel beam, and/or the first communication occasion being within the same communication protocol based time unit from the downlink control channel monitoring occasion.

In some aspects, the UE may prioritize the first communication occasion or the second communication occasion based at least in part on a frequency range of the first communication occasion and the second communication occasion, a frequency band of the first communication occasion and the second communication occasion, or a subcarrier spacing of the first communication occasion and the second communication occasion. For example, the UE may apply one or more prioritization techniques described herein based at least in part on communicating with the base station via an associated frequency range, frequency band, or subcarrier spacing, among other examples.

As shown by reference number 545, the UE may transmit to the base station, or receive from the base station, a communication via the first communication occasion associated with the first set of semi-statically configured communications or via the second communication occasion associated with the second set of semi-statically configured communications. The UE may transmit the communication based at least in part on a prioritization of the first communication occasion and/or the second communication occasion that is based at least in part on beams associated with the first communication occasion and/or the second communication occasion.

Based at least in part on the UE performing beam-based prioritization of semi-statically configured communications, the UE may avoid or reduce delay to configure the semi-statically configured communications with different priorities and may conserve communication and network resources to indicate changed priorities of the semi-statically configured communications.

As indicated above, FIG. 5 is provided as an example. Other examples may differ from what is described with respect to FIG. 5.

Figure 6:
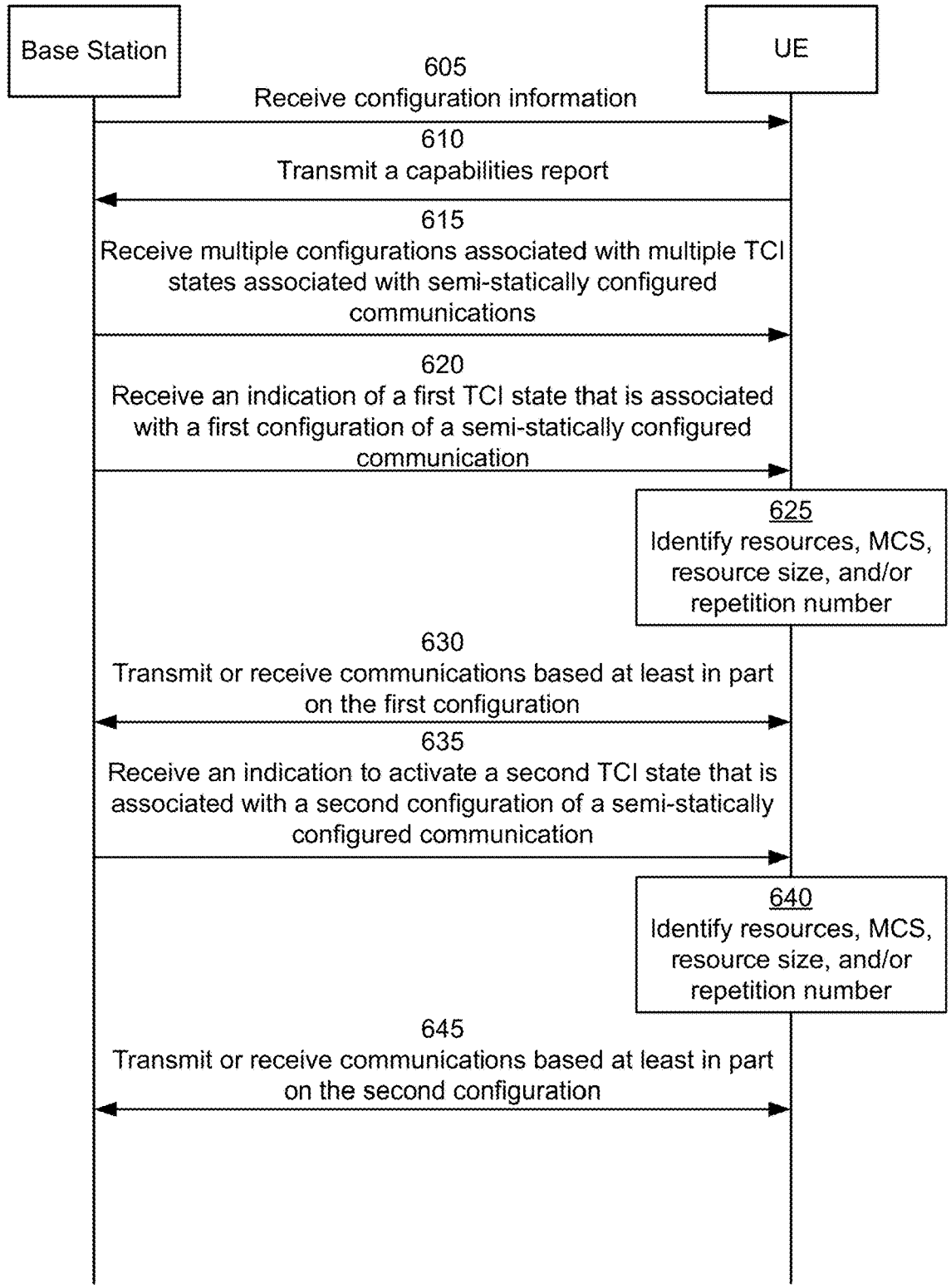
FIG. 6 is a diagram illustrating an example associated with transmission configuration information state-based configuration of semi-statically configured communications, in accordance with the present disclosure.

FIG. 6 is a diagram illustrating an example 600 associated with transmission configuration information (TCI) state based configuration of semi-statically configured communications, in accordance with the present disclosure. As shown in FIG. 6, a base station (e.g., base station 110) may communicate with a UE (e.g., UE 120). In some aspects, the base station and the UE may be part of a wireless network (e.g., wireless network 100). The UE and the base station may have established a wireless connection prior to operations shown in FIG. 6. The base station and the UE may be associated with one or more TRPs through which the base station and the UE may communicate.

As shown by reference number 605, the base station may transmit, and the UE may receive, configuration information. In some aspects, the UE may receive the configuration information via one or more of RRC signaling, one or more MAC CEs, and/or DCI, among other examples. In some aspects, the configuration information may include an indication of one or more configuration parameters (e.g., already known to the UE) for selection by the UE, or explicit configuration information for the UE to use to configure the UE, among other examples.

In some aspects, the configuration information may indicate that the UE is to receive multiple configurations associated with multiple TCI states that are associated with semi-statically configured communications. In some aspects, the configuration information may indicate that the UE is to configure one or more parameters for the semi-statically configured communications based at least in part on an active TCI state of the multiple TCI states. The semi-statically configured communications may include a CG and/or SPS, among other example.

The UE may configure itself based at least in part on the configuration information. In some aspects, the UE may be configured to perform one or more operations described herein based at least in part on the configuration information.

As shown by reference number 610, the UE may transmit, and the base station may receive, a capabilities report. The capabilities report may indicate UE support for receiving multiple configurations associated with multiple TCI states that are associated with semi-statically configured communications and configuring one or more parameters for the semi-statically configured communications based at least in part on an active TCI state of the multiple TCI states.

As shown by reference number 615, the UE may receive the multiple configurations associated with multiple TCI states associated with semi-statically configured communications. In some aspects, the UE may receive the multiple configurations as part of receiving the configuration information described in connection with reference number 605. In some aspects, the multiple configurations may be considered candidate configurations from which the base station may select an active configuration via a TCI state of the multiple TCI state. In some aspects, the multiple TCI states may be considered candidate TCI states that are mapped to the candidate configurations.

In some aspects, a first TCI state of the multiple TCI states is associated with a first set of time resources that is different from a second set of time resources that is associated with a second TCI state of the multiple TCI states. Additionally, or alternatively, the first TCI state is associated with a first set of frequency resources that is different from a second set of frequency resources that is associated with the second TCI state, and/or the first TCI state is associated with a first MCS that is different from a second MCS that is associated with the second TCI state. Additionally, or alternatively, the first TCI state is associated with a first resource size that is different from a second resource size that is associated with the second TCI state, and/or the first TCI state is associated with a first repetition number that is different from a second repetition number that is associated with the second TCI state.

As shown by reference number 620, the UE may receive an indication of a first TCI state that is associated with a first configuration of semi-statically configured communications. For example, the UE may receive the indication via dynamic signaling, such as DCI and/or a MAC CE. The dynamic signaling may be UE-specific signaling or group-common dynamic signaling. In some aspects, the indication may map to the first TCI state based at least in part on a bit map and/or an associated value of an indication field within the dynamic signaling.

As shown by reference number 625, the UE may identify resources (e.g., frequency and/or time resources), an MCS, a resource size (e.g., a number of resource blocks and/or a bandwidth to be used), and/or a repetition number (collectively, communication parameters based at least in part on the indication of the first TCI state and reception of the multiple configurations. For example, the communication parameters may be mapped to the first TCI state and/or QCL information received in connection with reference number 620.

As shown by reference number 630, the UE may transmit or receive communications based at least in part on the first configuration. For example, the UE may transmit or receive communications of the semi-statically configured communications using parameters associated with the first configuration.

As shown by reference number 635, the UE may receive an indication to activate a second TCI state that is associated with a second configuration of semi-statically configured communications. The UE may receive an indication to activate the second TCI state that is associated with a second configuration of the semi-statically configured communications. For example, the UE may receive the indication via dynamic signaling, such as DCI and/or a MAC CE. The dynamic signaling may be UE-specific signaling or group-common dynamic signaling. In some aspects, the indication may map to the TCI state based at least in part on a bit map and/or an associated value of an indication field within the dynamic signaling.

As shown by reference number 640, the UE may identify resources, an MCS, a resources size, and/or a repetition number (collectively, updated communication parameters) based at least in part on the indication of the TCI state and reception of the multiple configurations. For example, the updated communication parameters may be mapped to the second TCI state and/or QCL information received in connection with reference number 635.

As shown by reference number 645, the UE may transmit or receive communications based at least in part on the second configuration. For example, the UE may transmit or receive communications of the semi-statically configured communications using parameters associated with the second configuration.

Based at least in part on the UE applying beam-specific parameters for communicating via the semi-statically configured communications, the base station may update the beam-specific parameters after initiating the semi-statically configured communications based at least in part on transmitting an update to the TCI state, beam, and/or QCL information. In this way, the UE and the base station may conserve power, network, and/or communication resources that may have otherwise been used to communicate an update to parameters for the semi-statically configured communications.

As indicated above, FIG. 6 is provided as an example. Other examples may differ from what is described with respect to FIG. 6.

Figure 7A:
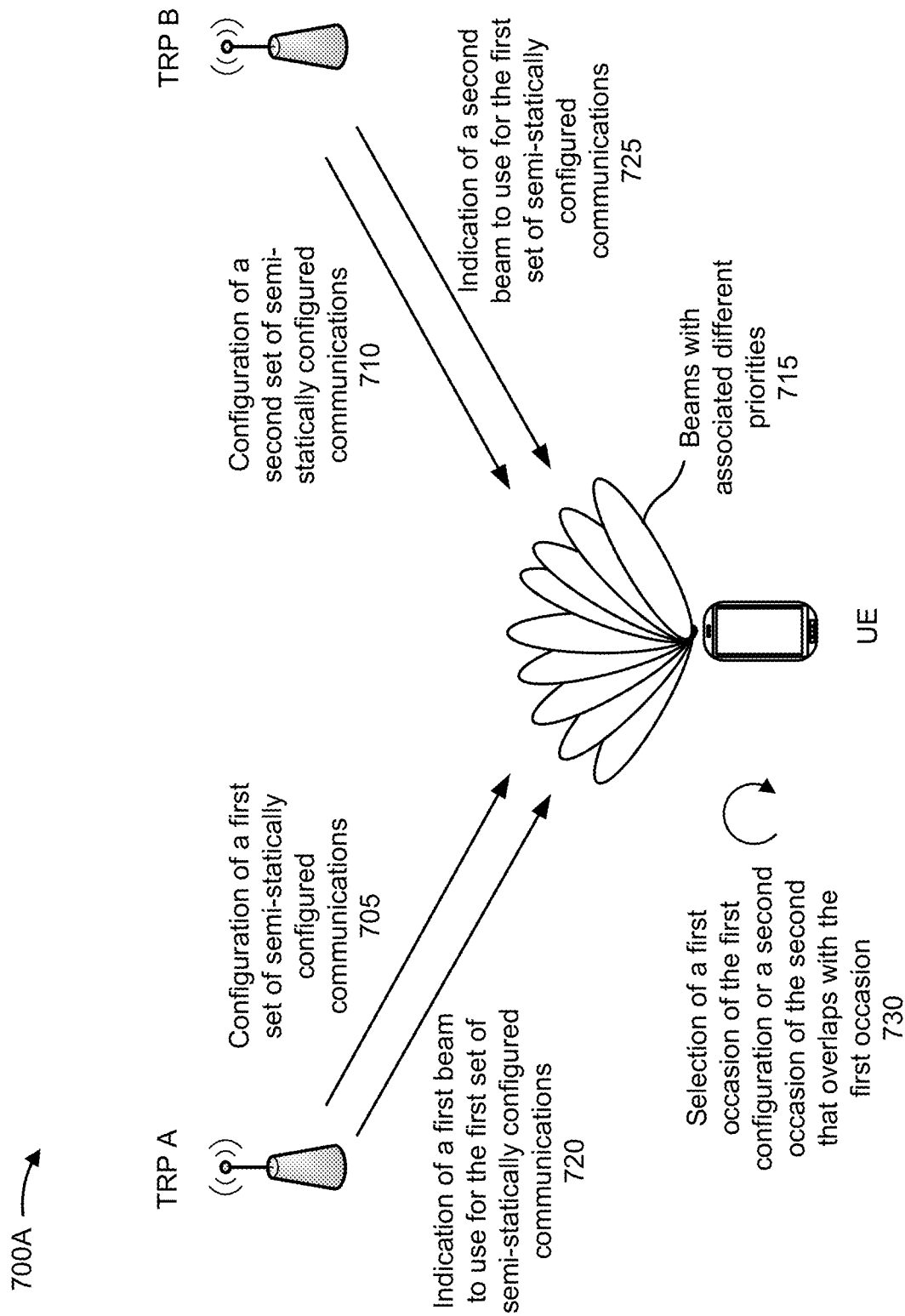
FIGS. 7A and 7B are diagrams illustrating examples associated with beam-based priority of semi-statically configured communications, in accordance with the present disclosure.
Figure 7B:
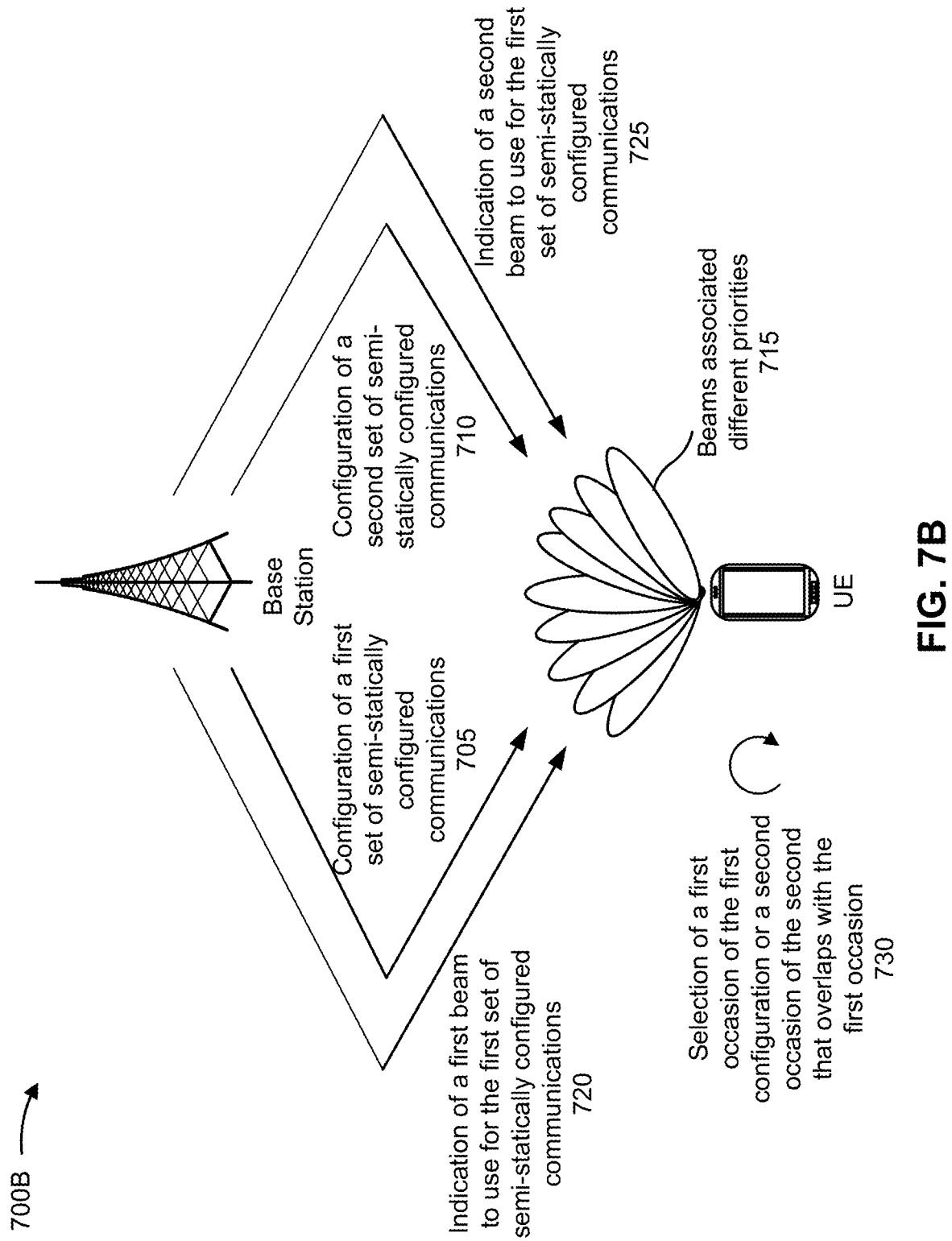

FIGS. 7A and 7B are diagrams illustrating examples 700A and 700B associated with beam-based priority of semi-statically configured communications, in accordance with the present disclosure. As shown in FIGS. 7A and 7B, a base station (e.g., base station 110 and/or a set of TRPs) may communicate with a UE (e.g., UE 120). In some aspects, the base station and the UE may be part of a wireless network (e.g., wireless network 100). The UE and the base station may have established a wireless connection prior to operations shown in FIGS. 7A and 7B. As shown in FIG. 7A, the base station may communicate via a TRP A and a TRP B via different sets of semi-statically configured communications. In some aspects, the UE may communicate with the TRP A using a first TCI state and/or first QCL information (e.g., a first beam) and may communicate with the TRP B using a second TCI state and/or second QCL information (e.g., a second beam). As shown in FIGS. 3 and 4, the TRP A and the TRP B may be in communication via backhaul coordination and/or via a base station (e.g., a control node). As shown in FIG. 7B, the UE may communicate with a single base station via multiple transmission and/or reception paths.

As shown in FIGS. 7A and 7B, a UE may receive a configuration of a first set 705 of semi-statically configured communications and a configuration of a second set 710 of semi-statically configured communications. The first set 705 and/or the second set 710 may include mappings from TCI states (e.g., TCI state identifications and/or QCL information, among other examples) to priorities, parameters for identifying the priorities (e.g., using dynamic parameters associated with communications with the UE) and/or sets of communication parameters for the first set 705 and/or the second set 710. The UE may be configured with multiple beams 715 associated with different priorities. The multiple beams may be considered candidate beams that may be chosen and/or that are associated with a priority.

In some aspects, the UE may receive an indication 720 of a first beam to use for the first set of semi-statically configured communications and an indication 725 of a second beam to use for the second set of semi-statically configured communications. In some aspects, the first beam and the second beam may be associated with different QCL information (e.g., different communication paths and/or different TRPs, among other examples).

The UE may form a selection 730 of a first occasion of the first configuration or a second occasion of the second configuration that overlaps with the first occasion. For example, the UE may select the first occasion or the second occasion based at least in part on a priority of the configuration of the first set 705 and/or the configuration of the second set 710. The UE may determine the priority based at least in part on beams associated with the first occasion (e.g., selected for use during the first occasion) and/or beams associated with the second occasion (e.g., selected for use during the second occasion).

As indicated above, FIGS. 7A-7B are provided as examples. Other examples may differ from what is described with respect to FIGS. 7A-7B.

Figure 8:
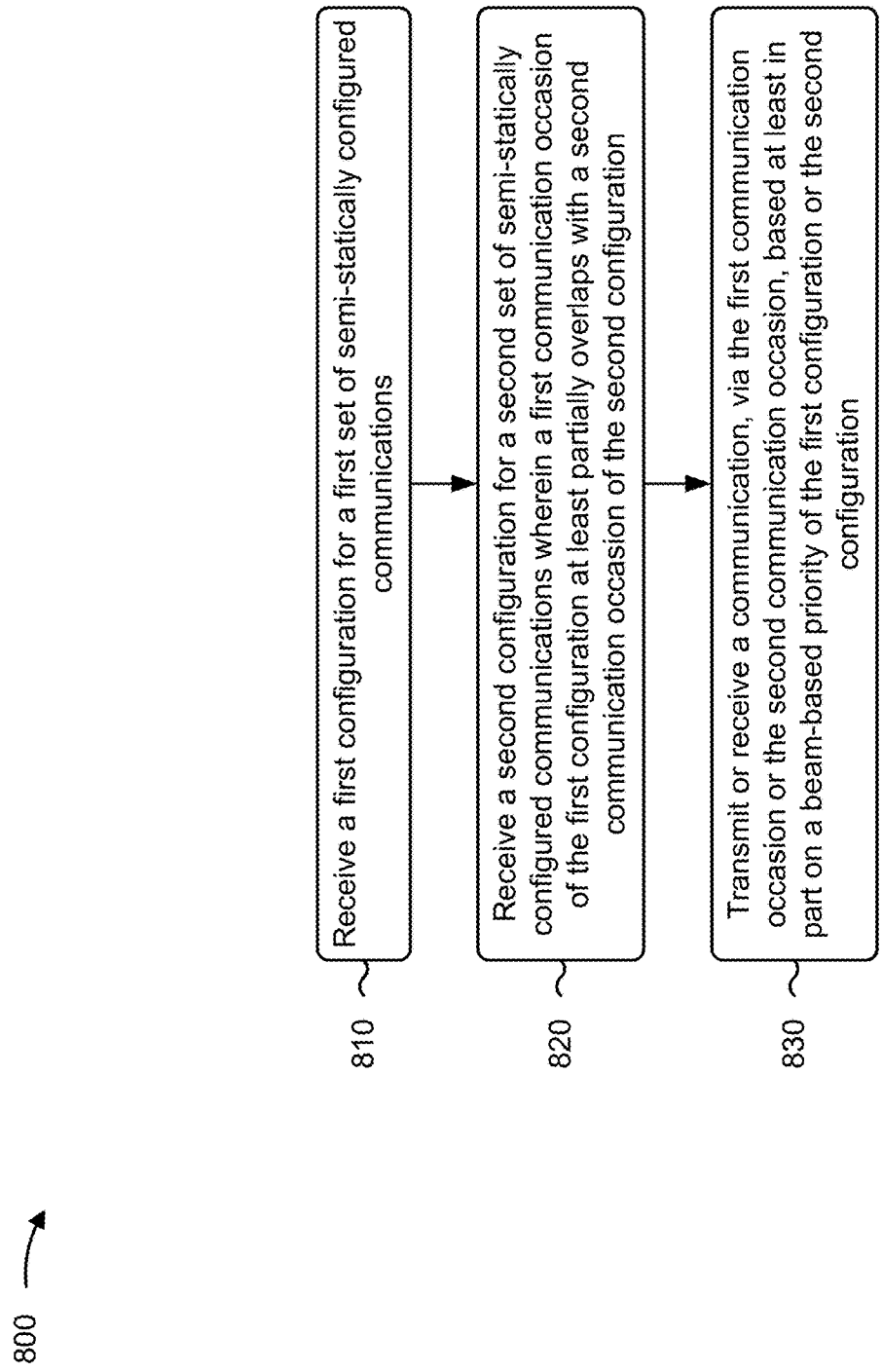
FIG. 8 is a diagram illustrating an example process associated with beam-based priority of semi-statically configured communications, in accordance with the present disclosure.

FIG. 8 is a diagram illustrating an example process 800 performed, for example, by a UE, in accordance with the present disclosure. Example process 800 is an example where the UE (e.g., UE 120) performs operations associated with beam-based priority of semi-statically configured communications.

As shown in FIG. 8, in some aspects, process 800 may include receiving a first configuration for a first set of semi-statically configured communications (block 810). For example, the UE (e.g., using communication manager 140 and/or reception component 1202, depicted in FIG. 12) may receive a first configuration for a first set of semi-statically configured communications, as described above.

As further shown in FIG. 8, in some aspects, process 800 may include receiving a second configuration for a second set of semi-statically configured communications, wherein a first communication occasion of the first configuration at least partially overlaps with a second communication occasion of the second configuration (block 820). For example, the UE (e.g., using communication manager 140 and/or reception component 1202, depicted in FIG. 12) may receive a second configuration for a second set of semi-statically configured communications, wherein a first communication occasion of the first configuration at least partially overlaps with a second communication occasion of the second configuration, as described above. In some aspects, a first communication occasion of the first configuration at least partially overlaps with a second communication occasion of the second configuration.

As further shown in FIG. 8, in some aspects, process 800 may include transmitting or receiving a communication, via the first communication occasion or the second communication occasion, based at least in part on a beam-based priority of the first configuration or the second configuration (block 830). For example, the UE (e.g., using communication manager 140 and/or transmission component 1204, depicted in FIG. 12) may transmit or receive a communication, via the first communication occasion or the second communication occasion, based at least in part on a beam-based priority of the first configuration or the second configuration, as described above.

Process 800 may include additional aspects, such as any single aspect or any combination of aspects described below and/or in connection with one or more other processes described elsewhere herein.

In a first aspect, the first communication occasion of the first configuration overlaps with the second communication occasion of the second configuration based at least in part on one or more of the first communication occasion and the second communication occasion completely overlapping in time, the first communication occasion and the second communication occasion partially overlapping in time, the first communication occasion and the second communication occasion completely overlapping in frequency, or the first communication occasion and the second communication occasion partially overlapping in frequency.

In a second aspect, alone or in combination with the first aspect, one or more of the first set of semi-statically configured communications and the second set of semi-statically configured communications are associated with one or more of a configured grant, or semi-persistent scheduling.

In a third aspect, alone or in combination with one or more of the first and second aspects, process 800 includes receiving an indication of a unified beam for uplink and downlink communications, wherein transmitting or receiving the communication, via the first communication occasion or the second communication occasion, based at least in part on a beam-based priority of the first configuration or the second configuration comprises transmitting or receiving the communication via the first communication occasion based at least in part on the first communication occasion being configured with quasi-co-location information that is associated with the unified beam.

In a fourth aspect, alone or in combination with one or more of the first through third aspects, process 800 includes receiving an indication of a downlink control channel beam, wherein transmitting or receiving the communication, via the first communication occasion or the second communication occasion, based at least in part on a beam-based priority of the first configuration or the second configuration comprises transmitting or receiving the communication via the first communication occasion based at least in part on the first communication occasion being configured with quasi-co-location information that is associated with the downlink control channel beam.

In a fifth aspect, alone or in combination with one or more of the first through fourth aspects, transmitting or receiving the communication, via the first communication occasion or the second communication occasion, based at least in part on a beam-based priority of the first configuration or the second configuration comprises transmitting or receiving the communication via the first communication occasion further based at least in part on the first communication occasion being within a same communication protocol-based time unit from a downlink control channel monitoring occasion.

In a sixth aspect, alone or in combination with one or more of the first through fifth aspects, transmitting or receiving the communication, via the first communication occasion or the second communication occasion, based at least in part on a beam-based priority of the first configuration or the second configuration is based at least in part on one or more of a frequency range of the first communication occasion and the second communication occasion, a frequency band of the first communication occasion and the second communication occasion, or a subcarrier spacing of the first communication occasion and the second communication occasion.

In a seventh aspect, alone or in combination with one or more of the first through sixth aspects, the first communication occasion is associated with first quasi-co-location information, and the second communication occasion is associated with second quasi-co-location information that is different from the first quasi-co-location information.

In an eighth aspect, alone or in combination with one or more of the first through seventh aspects, the first configuration indicates multiple TCI states and associated transmission parameters, and the beam-based priority of the first configuration or the second configuration is based at least in part on an active TCI state of the multiple TCI states.

In a ninth aspect, alone or in combination with one or more of the first through eighth aspects, the active TCI state is activated based at least in part on one or more of a time resource of the first communication occasion, a frequency resource of the first communication occasion, a modulation and coding scheme of the first communication occasion, a resource size of the first communication occasion, or a repetition number of the first communication occasion.

In a tenth aspect, alone or in combination with one or more of the first through ninth aspects, one or more of the modulation and coding scheme, the resource size, or the repetition number of the first communication occasion is based at least in part on one or more of previously transmitting reports from the UE, channeling measurements, signaling from a base station, or an amount of time from activation of the active TCI state.

In an eleventh aspect, alone or in combination with one or more of the first through tenth aspects, the active TCI state is activated based at least in part on one or more of group-common DCI, UE-specific DCI, one or more group-common MAC control elements (CEs), or one or more UE-specific MAC CEs.

In a twelfth aspect, alone or in combination with one or more of the first through eleventh aspects, the active TCI state is activated based at least in part on one or more of an indication of a beam switching command associated with a control beam, or a configured time pattern for switching between the multiple TCI states.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
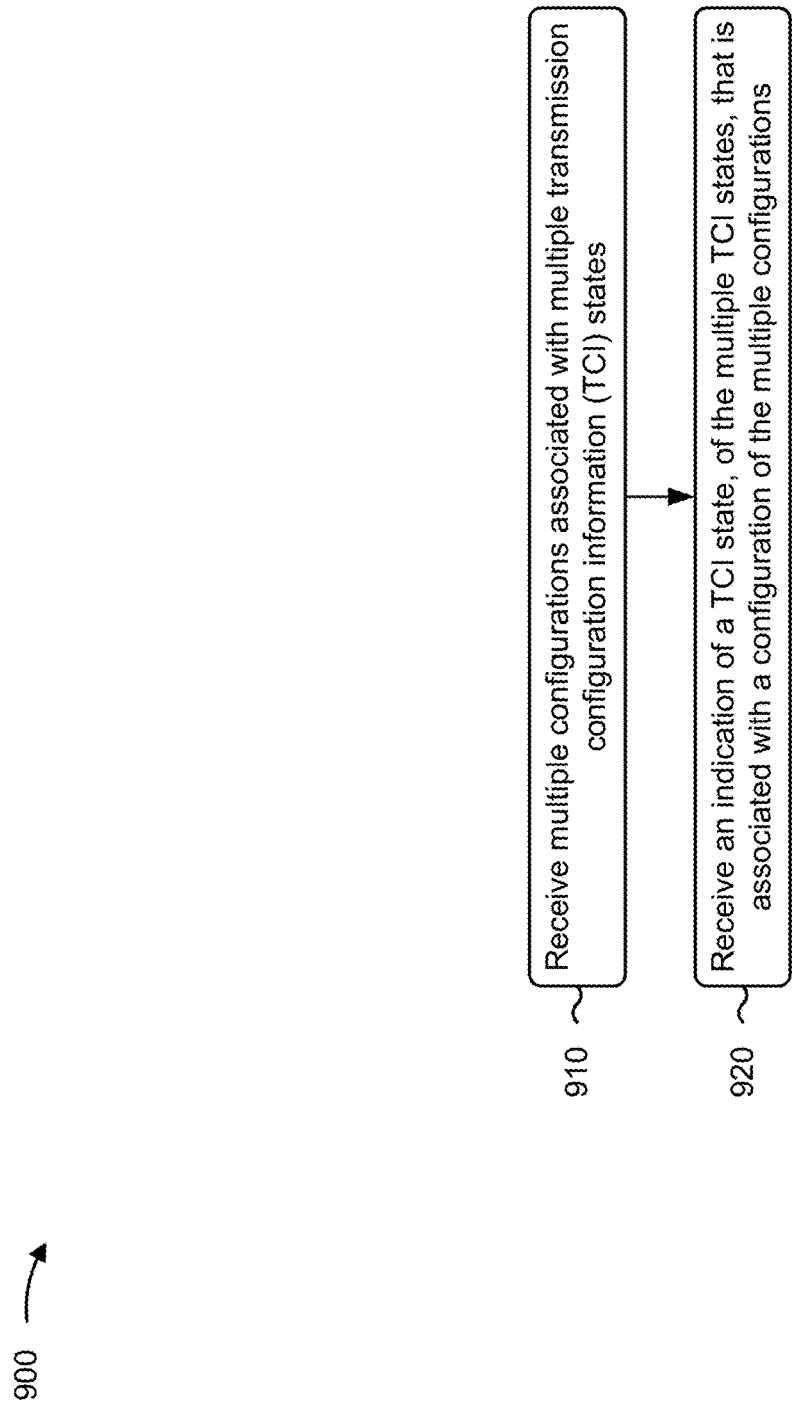
FIG. 9 is a diagram illustrating an example process associated with transmission configuration information state-based configuration of semi-statically configured communications, in accordance with the present disclosure.

FIG. 9 is a diagram illustrating an example process 900 performed, for example, by a UE, in accordance with the present disclosure. Example process 900 is an example where the UE (e.g., UE 120) performs operations associated with transmission configuration information state-based configuration of semi-statically configured communications.

As shown in FIG. 9, in some aspects, process 900 may include receiving multiple configurations associated with multiple TCI states (block 910). For example, the UE (e.g., using communication manager 140 and/or reception component 1202, depicted in FIG. 12) may receive multiple configurations associated with multiple TCI states, as described above.

As further shown in FIG. 9, in some aspects, process 900 may include receiving an indication of a TCI state, of the multiple TCI states, that is associated with a configuration of the multiple configurations (block 920). For example, the UE (e.g., using communication manager 140 and/or reception component 1202, depicted in FIG. 12) may receive an indication of a TCI state, of the multiple TCI states, that is associated with a configuration of the multiple configurations, as described above.

Process 900 may include additional aspects, such as any single aspect or any combination of aspects described below and/or in connection with one or more other processes described elsewhere herein.

In a first aspect, the multiple TCI states are associated with one or more of a configured grant, or semi-persistent scheduling.

In a second aspect, alone or in combination with the first aspect, one or more of a first TCI state of the multiple TCI states is associated with a first set of time resources that is different from a second set of time resources that is associated with a second TCI state of the multiple TCI states, the first TCI state is associated with a first set of frequency resources that is different from a second set of frequency resources that is associated with the second TCI state, the first TCI state is associated with a first MCS that is different from a second MCS that is associated with the second TCI state, the first TCI state is associated with a first resource size that is different from a second resource size that is associated with the second TCI state, or the first TCI state is associated with a first repetition number that is different from a second repetition number that is associated with the second TCI state.

In a third aspect, alone or in combination with one or more of the first and second aspects, one or more of the first MCS, the first resource size, the first repetition number, the second MCS, the second resource size, or the second repetition number are based at least in part on one or more of previously transmitting reports from the UE, channeling measurements, signaling from a base station, or an amount of time from activation of the TCI state.

In a fourth aspect, alone or in combination with one or more of the first through third aspects, receiving the indication of the TCI state comprises receiving the indication of the TCI state via one or more of group-common DCI, UE-specific DCI, one or more group-common MAC CEs, or one or more UE-specific MAC CEs.

In a fifth aspect, alone or in combination with one or more of the first through fourth aspects, process 900 includes activating an additional TCI state based at least in part on one or more of an indication of a beam switching command associated with a control beam, or a configured time pattern for switching between the multiple TCI states.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
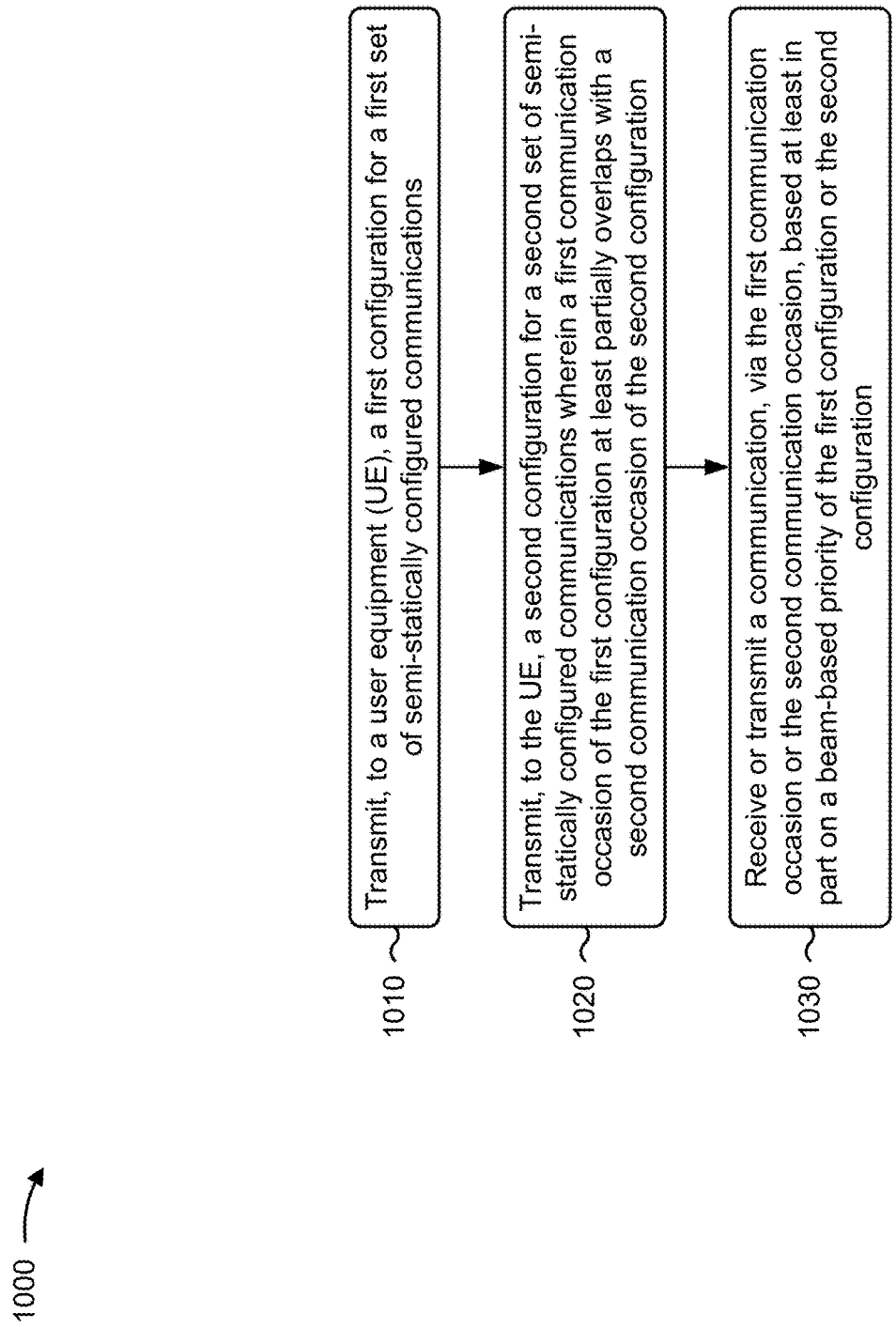
FIG. 10 is a diagram illustrating an example process associated with beam-based priority of semi-statically configured communications, in accordance with the present disclosure.

FIG. 10 is a diagram illustrating an example process 1000 performed, for example, by a base station, in accordance with the present disclosure. Example process 1000 is an example where the base station (e.g., base station 110) performs operations associated with beam-based priority of semi-statically configured communications.

As shown in FIG. 10, in some aspects, process 1000 may include transmitting, to a UE, a first configuration for a first set of semi-statically configured communications (block 1010). For example, the base station (e.g., using communication manager 150 and/or transmission component 1304, depicted in FIG. 13) may transmit, to a UE, a first configuration for a first set of semi-statically configured communications, as described above.

As further shown in FIG. 10, in some aspects, process 1000 may include transmitting, to the UE, a second configuration for a second set of semi-statically configured communications, wherein a first communication occasion of the first configuration at least partially overlaps with a second communication occasion of the second configuration (block 1020). For example, the base station (e.g., using communication manager 150 and/or transmission component 1304, depicted in FIG. 13) may transmit, to the UE, a second configuration for a second set of semi-statically configured communications, wherein a first communication occasion of the first configuration at least partially overlaps with a second communication occasion of the second configuration, as described above. In some aspects, a first communication occasion of the first configuration at least partially overlaps with a second communication occasion of the second configuration.

As further shown in FIG. 10, in some aspects, process 1000 may include receiving or transmitting a communication, via the first communication occasion or the second communication occasion, based at least in part on a beam-based priority of the first configuration or the second configuration (block 1030). For example, the base station (e.g., using communication manager 150 and/or reception component 1302, depicted in FIG. 13) may receive or transmit a communication, via the first communication occasion or the second communication occasion, based at least in part on a beam-based priority of the first configuration or the second configuration, as described above.

Process 1000 may include additional aspects, such as any single aspect or any combination of aspects described below and/or in connection with one or more other processes described elsewhere herein.

In a first aspect, the first communication occasion of the first configuration overlaps with the second communication occasion of the second configuration based at least in part on one or more of the first communication occasion and the second communication occasion completely overlapping in time, the first communication occasion and the second communication occasion partially overlapping in time, the first communication occasion and the second communication occasion completely overlapping in frequency, or the first communication occasion and the second communication occasion partially overlapping in frequency.

In a second aspect, alone or in combination with the first aspect, one or more of the first set of semi-statically configured communications and the second set of semi-statically configured communications are associated with one or more of a configured grant, or semi-persistent scheduling.

In a third aspect, alone or in combination with one or more of the first and second aspects, process 1000 includes transmitting an indication of a unified beam for uplink and downlink communications, wherein receiving or transmitting the communication, via the first communication occasion or the second communication occasion, based at least in part on a beam-based priority of the first configuration or the second configuration comprises receiving or transmitting the communication via the first communication occasion based at least in part on the first communication occasion being configured with quasi-co-location information that is associated with the unified beam.

In a fourth aspect, alone or in combination with one or more of the first through third aspects, process 1000 includes transmitting an indication of a downlink control channel beam, wherein receiving or transmitting the communication, via the first communication occasion or the second communication occasion, based at least in part on a beam-based priority of the first configuration or the second configuration comprises receiving or transmitting the communication via the first communication occasion based at least in part on the first communication occasion being configured with quasi-co-location information that is associated with the downlink control channel beam.

In a fifth aspect, alone or in combination with one or more of the first through fourth aspects, receiving or transmitting the communication, via the first communication occasion or the second communication occasion, based at least in part on a beam-based priority of the first configuration or the second configuration comprises receiving or transmitting the communication via the first communication occasion further based at least in part on the first communication occasion being within a same communication protocol-based time unit from a downlink control channel monitoring occasion.

In a sixth aspect, alone or in combination with one or more of the first through fifth aspects, receiving or transmitting the communication, via the first communication occasion or the second communication occasion, based at least in part on a beam-based priority of the first configuration or the second configuration is based at least in part on one or more of a frequency range of the first communication occasion and the second communication occasion, a frequency band of the first communication occasion and the second communication occasion, or a subcarrier spacing of the first communication occasion and the second communication occasion.

In a seventh aspect, alone or in combination with one or more of the first through sixth aspects, the first communication occasion is associated with first quasi-co-location information, and the second communication occasion is associated with second quasi-co-location information that is different from the first quasi-co-location information.

In an eighth aspect, alone or in combination with one or more of the first through seventh aspects, the first configuration indicates multiple TCI states and associated transmission parameters, and the beam-based priority of the first configuration or the second configuration is based at least in part on an active TCI state of the multiple TCI states.

In a ninth aspect, alone or in combination with one or more of the first through eighth aspects, the active TCI state is activated based at least in part on one or more of a time resource of the first communication occasion, a frequency resource of the first communication occasion, a modulation and coding scheme of the first communication occasion, a resource size of the first communication occasion, or a repetition number of the first communication occasion.

In a tenth aspect, alone or in combination with one or more of the first through ninth aspects, one or more of the modulation and coding scheme, the resource size, or the repetition number of the first communication occasion is based at least in part on one or more of previously transmitting reports from the UE, channeling measurements, signaling from the base station, or an amount of time from activation of the active TCI state.

In an eleventh aspect, alone or in combination with one or more of the first through tenth aspects, the active TCI state is activated based at least in part on one or more of group-common DCI, UE-specific DCI, one or more group-common MAC CEs, or one or more UE-specific MAC CEs.

In a twelfth aspect, alone or in combination with one or more of the first through eleventh aspects, the active TCI state is activated based at least in part on one or more of an indication of a beam switching command associated with a control beam, or a configured time pattern for switching between the multiple TCI states.

In a thirteenth aspect, alone or in combination with one or more of the first through twelfth aspects, process 1000 includes activating an additional TCI state based at least in part on one or more of an indication of a beam switching command associated with a control beam, or a configured time pattern for switching between the multiple TCI states.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
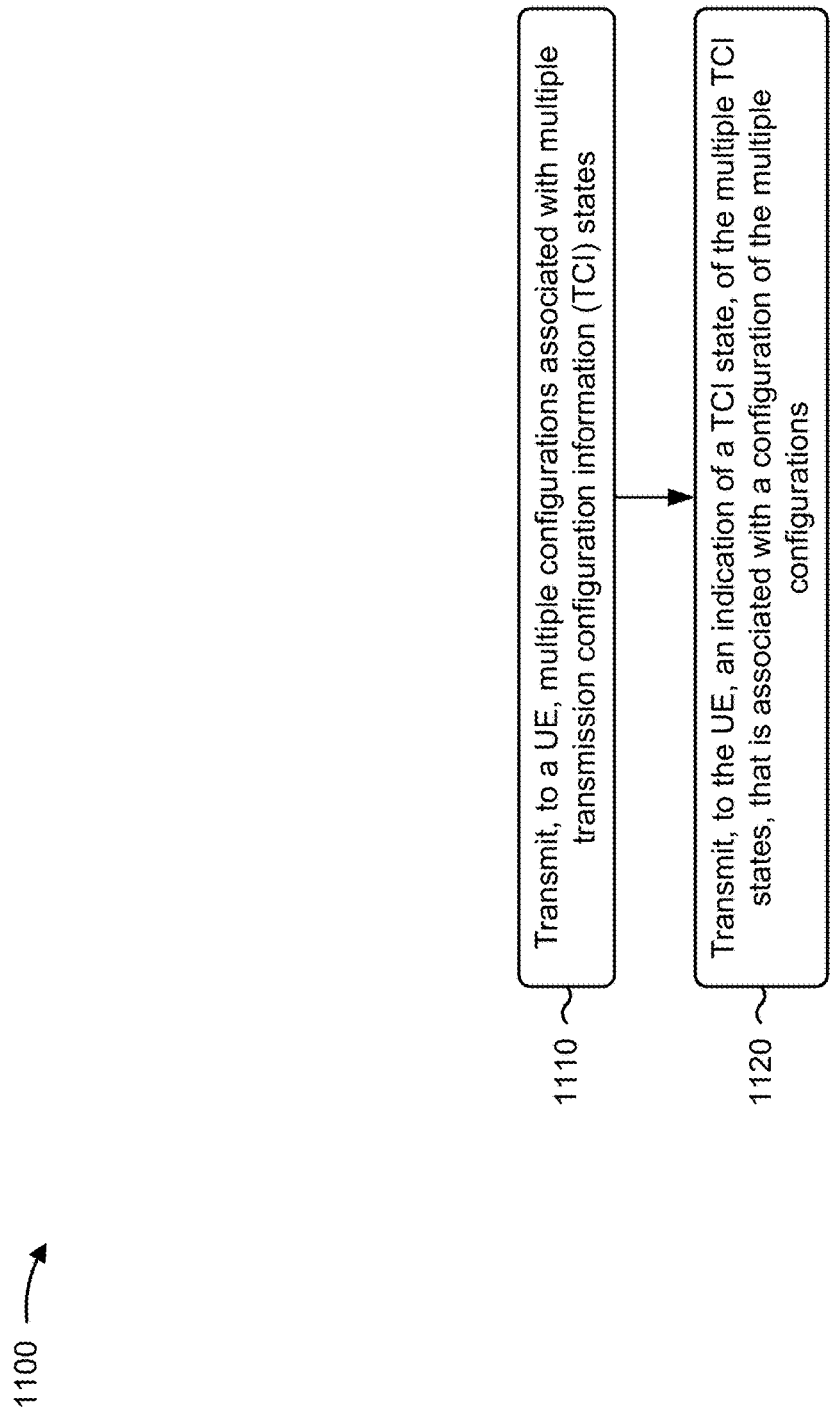
FIG. 11 is a diagram illustrating an example process associated with transmission configuration information state-based configuration of semi-statically configured communications, in accordance with the present disclosure.

FIG. 11 is a diagram illustrating an example process 1100 performed, for example, by a base station, in accordance with the present disclosure. Example process 1100 is an example where the base station (e.g., base station 110) performs operations associated with transmission configuration information state based configuration of semi-statically configured communications.

As shown in FIG. 11, in some aspects, process 1100 may include transmitting, to a UE, multiple configurations associated with multiple TCI states (block 1110). For example, the base station (e.g., using communication manager 150 and/or transmission component 1304, depicted in FIG. 13) may transmit, to a UE, multiple configurations associated with multiple TCI states, as described above.

As further shown in FIG. 11, in some aspects, process 1100 may include transmitting, to the UE, an indication of a TCI state, of the multiple TCI states, that is associated with a configuration of the multiple configurations (block 1120). For example, the base station (e.g., using communication manager 150 and/or transmission component 1304, depicted in FIG. 13) may transmit, to the UE, an indication of a TCI state, of the multiple TCI states, that is associated with a configuration of the multiple configurations, as described above.

Process 1100 may include additional aspects, such as any single aspect or any combination of aspects described below and/or in connection with one or more other processes described elsewhere herein.

In a first aspect, the multiple TCI states are associated with one or more of a configured grant, or semi-persistent scheduling.

In a second aspect, alone or in combination with the first aspect, one or more of a first TCI state of the multiple TCI states is associated with a first set of time resources that is different from a second set of time resources that is associated with a second TCI state of the multiple TCI states, the first TCI state is associated with a first set of frequency resources that is different from a second set of frequency resources that is associated with the second TCI state, the first TCI state is associated with a first MCS that is different from a second MCS that is associated with the second TCI state, the first TCI state is associated with a first resource size that is different from a second resource size that is associated with the second TCI state, or the first TCI state is associated with a first repetition number that is different from a second repetition number that is associated with the second TCI state.

In a third aspect, alone or in combination with one or more of the first and second aspects, one or more of the first MCS, the first resource size, the first repetition number, the second MCS, the second resource size, the second repetition number are based at least in part on one or more of previously transmitting reports from the UE, channeling measurements, signaling from the base station, or an amount of time from activation of the TCI state.

In a fourth aspect, alone or in combination with one or more of the first through third aspects, transmitting the indication of the TCI state comprises transmitting the indication of the TCI state via one or more of group-common DCI, UE-specific DCI, one or more group-common MAC CEs, or one or more UE-specific MAC CEs.

In a fifth aspect, alone or in combination with one or more of the first through fourth aspects, process 1100 includes transmitting, to the UE, an indication to activate an additional TCI state based at least in part on one or more of an indication of a beam switching command associated with a control beam, or a configured time pattern for switching between the multiple TCI states.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
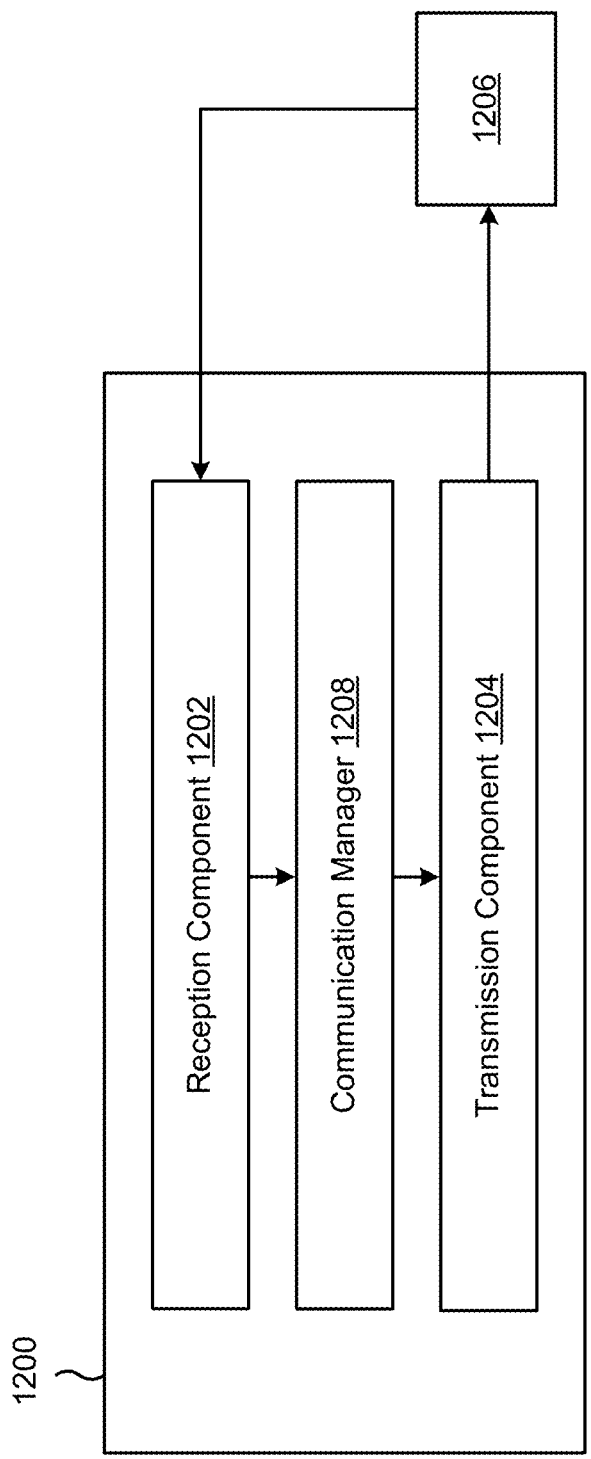
FIGS. 12 and 13 are diagrams of example apparatuses for wireless communication, in accordance with the present disclosure.

FIG. 12 is a diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a communication manager 1208 (e.g., the communication manager 140).

In some aspects, the apparatus 1200 may be configured to perform one or more operations described herein in connection with FIGS. 5-7B. Additionally, or alternatively, the apparatus 1200 may be configured to perform one or more processes described herein, such as process 800 of FIG. 8, process 900 of FIG. 9, or a combination thereof. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The reception component 1202 may receive a first configuration for a first set of semi-statically configured communications. The reception component 1202 may receive a second configuration for a second set of semi-statically configured communications wherein a first communication occasion of the first configuration at least partially overlaps with a second communication occasion of the second configuration. The transmission component 1204 may transmit or receive a communication, via the first communication occasion or the second communication occasion, based at least in part on a beam-based priority of the first configuration or the second configuration.

The reception component 1202 may receive an indication of a unified beam for uplink and downlink communications wherein transmitting or receiving the communication, via the first communication occasion or the second communication occasion, based at least in part on a beam-based priority of the first configuration or the second configuration, comprises transmitting or receiving the communication via the first communication occasion based at least in part on the first communication occasion being configured with quasi-co-location information that is associated with the unified beam.

The reception component 1202 may receive an indication of a downlink control channel beam, wherein transmitting or receiving the communication, via the first communication occasion or the second communication occasion, based at least in part on a beam-based priority of the first configuration or the second configuration, comprises transmitting or receiving the communication via the first communication occasion based at least in part on the first communication occasion being configured with quasi-co-location information that is associated with the downlink control channel beam.

The reception component 1202 may receive multiple configurations associated with multiple TCI states. The reception component 1202 may receive an indication of a TCI state, of the multiple TCI states, that is associated with a configuration of the multiple configurations.

The communication manager 1208 may activate an additional TCI state based at least in part on one or more of an indication of a beam switching command associated with a control beam, or a configured time pattern for switching between the multiple TCI states.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
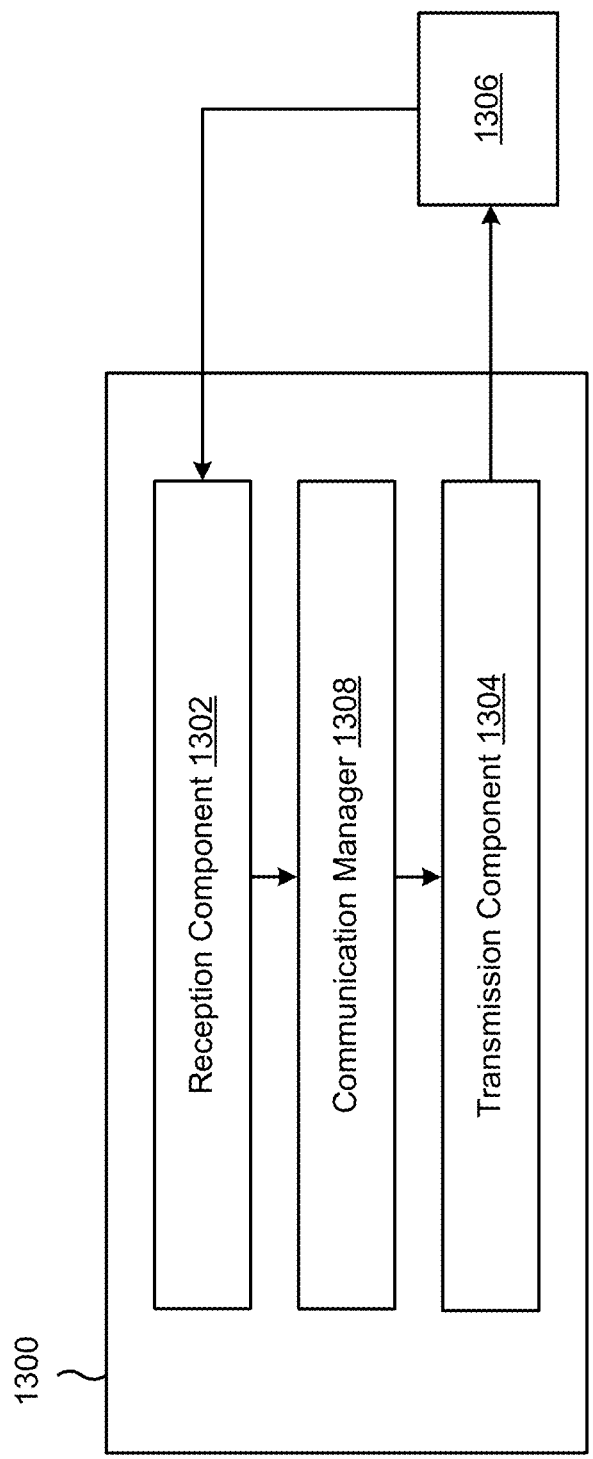

FIG. 13 is a diagram of an example apparatus 1300 for wireless communication. The apparatus 1300 may be a base station, or a base station may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a communication manager 1308 (e.g., the communication manager 150).

In some aspects, the apparatus 1300 may be configured to perform one or more operations described herein in connection with FIGS. 5-7B. Additionally, or alternatively, the apparatus 1300 may be configured to perform one or more processes described herein, such as process 1000 of FIG. 10, process 1100 of FIG. 11, or a combination thereof. In some aspects, the apparatus 1300 and/or one or more components shown in FIG. 13 may include one or more components of the base station described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the base station described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the base station described in connection with FIG. 2. In some aspects, the transmission component 1304 may be co-located with the reception component 1302 in a transceiver.

The transmission component 1304 may transmit, to a UE, a first configuration for a first set of semi-statically configured communications. The transmission component 1304 may transmit, to the UE, a second configuration for a second set of semi-statically configured communications, wherein a first communication occasion of the first configuration at least partially overlaps with a second communication occasion of the second configuration. The reception component 1302 may receive or transmit a communication, via the first communication occasion or the second communication occasion, based at least in part on a beam-based priority of the first configuration or the second configuration.

The transmission component 1304 may transmit an indication of a unified beam for uplink and downlink communications, wherein receiving or transmitting the communication, via the first communication occasion or the second communication occasion, based at least in part on a beam-based priority of the first configuration or the second configuration, comprises receiving or transmitting the communication via the first communication occasion based at least in part on the first communication occasion being configured with quasi-co-location information that is associated with the unified beam.

The transmission component 1304 may transmit an indication of a downlink control channel beam, wherein receiving or transmitting the communication, via the first communication occasion or the second communication occasion, based at least in part on a beam-based priority of the first configuration or the second configuration, comprises receiving or transmitting the communication via the first communication occasion based at least in part on the first communication occasion being configured with quasi-co-location information that is associated with the downlink control channel beam.

The communication manager 1308 and/or the transmission component 1304 may activate an additional TCI state based at least in part on one or more of an indication of a beam switching command associated with a control beam, or a configured time pattern for switching between the multiple TCI states.

The transmission component 1304 may transmit, to a UE, multiple configurations associated with multiple TCI states. The transmission component 1304 may transmit, to the UE, an indication of a TCI state, of the multiple TCI states, that is associated with a configuration of the multiple configurations.

The transmission component 1304 may transmit, to the UE, an indication to activate an additional TCI state based at least in part on one or more of an indication of a beam switching command associated with a control beam, or a configured time pattern for switching between the multiple TCI states.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: receiving a first configuration for a first set of semi-statically configured communications; receiving a second configuration for a second set of semi-statically configured communications, wherein a first communication occasion of the first configuration at least partially overlaps with a second communication occasion of the second configuration; and transmitting or receiving a communication, via the first communication occasion or the second communication occasion, based at least in part on a beam-based priority of the first configuration or the second configuration.

Aspect 2: The method of Aspect 1, wherein the first communication occasion of the first configuration overlaps with the second communication occasion of the second configuration based at least in part on one or more of: the first communication occasion and the second communication occasion completely overlapping in time, the first communication occasion and the second communication occasion partially overlapping in time, the first communication occasion and the second communication occasion completely overlapping in frequency, or the first communication occasion and the second communication occasion partially overlapping in frequency.

Aspect 3: The method of any of Aspects 1 or 2, wherein one or more of the first set of semi-statically configured communications and the second set of semi-statically configured communications are associated with one or more of: a configured grant, or semi-persistent scheduling.

Aspect 4: The method of any of Aspects 1-3, further comprising: receiving an indication of a unified beam for uplink and downlink communications, wherein transmitting or receiving the communication, via the first communication occasion or the second communication occasion, based at least in part on a beam-based priority of the first configuration or the second configuration comprises transmitting or receiving the communication via the first communication occasion based at least in part on the first communication occasion being configured with quasi-co-location information that is associated with the unified beam.

Aspect 5: The method of any of Aspects 1-4, further comprising: receiving an indication of a downlink control channel beam, wherein transmitting or receiving the communication, via the first communication occasion or the second communication occasion, based at least in part on a beam-based priority of the first configuration or the second configuration comprises transmitting or receiving the communication via the first communication occasion based at least in part on the first communication occasion being configured with quasi-co-location information that is associated with the downlink control channel beam.

Aspect 6: The method of Aspect 5, wherein transmitting or receiving the communication, via the first communication occasion or the second communication occasion, based at least in part on a beam-based priority of the first configuration or the second configuration comprises transmitting or receiving the communication via the first communication occasion further based at least in part on: the first communication occasion being within a same communication protocol-based time unit from a downlink control channel monitoring occasion.

Aspect 7: The method of any of Aspects 1-6, wherein transmitting or receiving the communication, via the first communication occasion or the second communication occasion, based at least in part on a beam-based priority of the first configuration or the second configuration is based at least in part on one or more of: a frequency range of the first communication occasion and the second communication occasion, a frequency band of the first communication occasion and the second communication occasion, or a subcarrier spacing of the first communication occasion and the second communication occasion.

Aspect 8: The method of any of Aspects 1-7, wherein the first communication occasion is associated with first quasi-co-location information, and wherein the second communication occasion is associated with second quasi-co-location information that is different from the first quasi-co-location information.

Aspect 9: The method of any of Aspects 1-8, wherein the first configuration indicates multiple transmission configuration information (TCI) states and associated transmission parameters, and wherein the beam-based priority of the first configuration or the second configuration is based at least in part on an active TCI state of the multiple TCI states.

Aspect 10: The method of Aspect 9, wherein the active TCI state is activated based at least in part on one or more of: a time resource of the first communication occasion, a frequency resource of the first communication occasion, a modulation and coding scheme of the first communication occasion, a resource size of the first communication occasion, or a repetition number of the first communication occasion.

Aspect 11: The method of Aspect 10, wherein one or more of the modulation and coding scheme, the resource size, or the repetition number of the first communication occasion is based at least in part on one or more of: previously transmitted reports from the UE, channel measurements, dynamic signaling from a base station, or an amount of time from activation of the active TCI state.

Aspect 12: The method of any of Aspects 9-11, wherein the active TCI state is activated based at least in part on one or more of: group-common downlink control information (DCI), UE-specific DCI, one or more group-common medium access control (MAC) control elements (CEs), or one or more UE-specific MAC CEs.

Aspect 13: The method of any of Aspects 9-12, wherein the active TCI state is activated based at least in part on one or more of: an indication of a beam switching command associated with a control beam, or a configured time pattern for switching between the multiple TCI states.

Aspect 14: A method of wireless communication performed by a user equipment (UE), comprising: receiving multiple configurations associated with multiple transmission configuration information (TCI) states; and receiving an indication of a TCI state, of the multiple TCI states, that is associated with a configuration of the multiple configurations.

Aspect 15: The method of Aspect 14, wherein the multiple TCI states are associated with one or more of: a configured grant, or semi-persistent scheduling.

Aspect 16: The method of any of Aspects 14 or 15, wherein one or more of: a first TCI state of the multiple TCI states is associated with a first set of time resources that is different from a second set of time resources that is associated with a second TCI state of the multiple TCI states, the first TCI state is associated with a first set of frequency resources that is different from a second set of frequency resources that is associated with the second TCI state, the first TCI state is associated with a first modulation and coding scheme (MCS) that is different from a second MCS that is associated with the second TCI state, the first TCI state is associated with a first resource size that is different from a second resource size that is associated with the second TCI state, or the first TCI state is associated with a first repetition number that is different from a second repetition number that is associated with the second TCI state.

Aspect 17: The method of Aspect 16, wherein one or more of the first MCS, the first resource size, the first repetition number, the second MCS, the second resource size, or the second repetition number are based at least in part on one or more of: previously transmitted reports from the UE, channel measurements, dynamic signaling from a base station, or an amount of time from activation of the TCI state.

Aspect 18: The method of any of Aspects 14-17, wherein receiving the indication of the TCI state comprises receiving the indication of the TCI state via one or more of: group-common downlink control information (DCI), UE-specific DCI, one or more group-common medium access control (MAC) control elements (CEs), or one or more UE-specific MAC CEs.

Aspect 19: The method of any of Aspects 14-18, further comprising activating an additional TCI state based at least in part on one or more of: an indication of a beam switching command associated with a control beam, or a configured time pattern for switching between the multiple TCI states.

Aspect 20: A method of wireless communication performed by a base station, comprising: transmitting, to a user equipment (UE), a first configuration for a first set of semi-statically configured communications; transmitting, to the UE, a second configuration for a second set of semi-statically configured communications, wherein a first communication occasion of the first configuration at least partially overlaps with a second communication occasion of the second configuration; and receiving or transmitting a communication, via the first communication occasion or the second communication occasion, based at least in part on a beam-based priority of the first configuration or the second configuration.

Aspect 21: The method of Aspect 20, wherein the first communication occasion of the first configuration overlaps with the second communication occasion of the second configuration based at least in part on one or more of: the first communication occasion and the second communication occasion completely overlapping in time, the first communication occasion and the second communication occasion partially overlapping in time, the first communication occasion and the second communication occasion completely overlapping in frequency, or the first communication occasion and the second communication occasion partially overlapping in frequency.

Aspect 22: The method of any of Aspects 20 or 21, wherein one or more of the first set of semi-statically configured communications and the second set of semi-statically configured communications are associated with one or more of: a configured grant, or semi-persistent scheduling.

Aspect 23: The method of any of Aspects 20-22, further comprising: transmitting an indication of a unified beam for uplink and downlink communications, wherein receiving or transmitting the communication, via the first communication occasion or the second communication occasion, based at least in part on a beam-based priority of the first configuration or the second configuration comprises receiving or transmitting the communication via the first communication occasion based at least in part on the first communication occasion being configured with quasi-co-location information that is associated with the unified beam.

Aspect 24: The method of any of Aspects 20-23, further comprising: transmitting an indication of a downlink control channel beam, wherein receiving or transmitting the communication, via the first communication occasion or the second communication occasion, based at least in part on a beam-based priority of the first configuration or the second configuration comprises receiving or transmitting the communication via the first communication occasion based at least in part on the first communication occasion being configured with quasi-co-location information that is associated with the downlink control channel beam.

Aspect 25: The method of Aspect 24, wherein receiving or transmitting the communication, via the first communication occasion or the second communication occasion, based at least in part on a beam-based priority of the first configuration or the second configuration comprises receiving or transmitting the communication via the first communication occasion further based at least in part on: the first communication occasion being within a same communication protocol-based time unit from a downlink control channel monitoring occasion.

Aspect 26: The method of any of Aspects 20-25, wherein receiving or transmitting the communication, via the first communication occasion or the second communication occasion, based at least in part on a beam-based priority of the first configuration or the second configuration is based at least in part on one or more of: a frequency range of the first communication occasion and the second communication occasion, a frequency band of the first communication occasion and the second communication occasion, or a subcarrier spacing of the first communication occasion and the second communication occasion.

Aspect 27: The method of any of Aspects 20-26, wherein the first communication occasion is associated with first quasi-co-location information, and wherein the second communication occasion is associated with second quasi-co-location information that is different from the first quasi-co-location information.

Aspect 28: The method of any of Aspects 20-27, wherein the first configuration indicates multiple transmission configuration information (TCI) states and associated transmission parameters, and wherein the beam-based priority of the first configuration or the second configuration is based at least in part on an active TCI state of the multiple TCI states.

Aspect 29: The method of Aspect 28, wherein the active TCI state is activated based at least in part on one or more of: a time resource of the first communication occasion, a frequency resource of the first communication occasion, a modulation and coding scheme of the first communication occasion, a resource size of the first communication occasion, or a repetition number of the first communication occasion.

Aspect 30: The method of Aspect 29, wherein one or more of the modulation and coding scheme, the resource size, or the repetition number of the first communication occasion is based at least in part on one or more of: previously transmitted reports from the UE, channel measurements, dynamic signaling from the base station, or an amount of time from activation of the active TCI state.

Aspect 31: The method of any of Aspects 28-30, wherein the active TCI state is activated based at least in part on one or more of: group-common downlink control information (DCI), UE-specific DCI, one or more group-common medium access control (MAC) control elements (CEs), or one or more UE-specific MAC CEs.

Aspect 32: The method of any of Aspects 28-31, wherein the active TCI state is activated based at least in part on one or more of: an indication of a beam switching command associated with a control beam, or a configured time pattern for switching between the multiple TCI states.

Aspect 33: The method of any of Aspects 28-32, further comprising activating an additional TCI state based at least in part on one or more of: an indication of a beam switching command associated with a control beam, or a configured time pattern for switching between the multiple TCI states.

Aspect 34: A method of wireless communication performed by a base station, comprising: transmitting, to a user equipment (UE) multiple configurations associated with multiple transmission configuration information (TCI) states; and transmitting, to the UE, an indication of a TCI state, of the multiple TCI states, that is associated with a configuration of the multiple configurations.

Aspect 35: The method of Aspect 34, wherein the multiple TCI states are associated with one or more of: a configured grant, or semi-persistent scheduling.

Aspect 36: The method of any of Aspects 34 or 35, wherein one or more of: a first TCI state of the multiple TCI states is associated with a first set of time resources that is different from a second set of time resources that is associated with a second TCI state of the multiple TCI states, the first TCI state is associated with a first set of frequency resources that is different from a second set of frequency resources that is associated with the second TCI state, the first TCI state is associated with a first modulation and coding scheme (MCS) that is different from a second MCS that is associated with the second TCI state, the first TCI state is associated with a first resource size that is different from a second resource size that is associated with the second TCI state, or the first TCI state is associated with a first repetition number that is different from a second repetition number that is associated with the second TCI state.

Aspect 37: The method of Aspect 36, wherein one or more of the first MCS, the first resource size, the first repetition number, the second MCS, the second resource size, the second repetition number are based at least in part on one or more of: previously transmitted reports from the UE, channel measurements, dynamic signaling from the base station, or an amount of time from activation of the TCI state.

Aspect 38: The method of any of Aspects 34-37, wherein transmitting the indication of the TCI state comprises transmitting the indication of the TCI state via one or more of: group-common downlink control information (DCI), UE-specific DCI, one or more group-common medium access control (MAC) control elements (CEs), or one or more UE-specific MAC CEs.

Aspect 39: The method of any of Aspects 34-38, further comprising transmitting, to the UE, an indication to activate an additional TCI state based at least in part on one or more of: an indication of a beam switching command associated with a control beam, or a configured time pattern for switching between the multiple TCI states.

Aspect 40: An apparatus for wireless communication at a device, comprising a processor; memory coupled with the processor; and instructions stored in the memory and executable by the processor to cause the apparatus to perform the method of one or more of Aspects 1-39.

Aspect 41: A device for wireless communication, comprising a memory and one or more processors coupled to the memory, the one or more processors configured to perform the method of one or more of Aspects 1-39.

Aspect 42: An apparatus for wireless communication, comprising at least one means for performing the method of one or more of Aspects 1-39.

Aspect 43: A non-transitory computer-readable medium storing code for wireless communication, the code comprising instructions executable by a processor to perform the method of one or more of Aspects 1-39.

Aspect 44: A non-transitory computer-readable medium storing a set of instructions for wireless communication, the set of instructions comprising one or more instructions that, when executed by one or more processors of a device, cause the device to perform the method of one or more of Aspects 1-39.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
   receive a first configuration for a first set of semi-statically configured communications;
   receive a second configuration for a second set of semi-statically configured communications,
      wherein a first communication occasion of the first configuration at least partially overlaps with a second communication occasion of the second configuration; and
   transmit or receive a communication, via the first communication occasion or the second communication occasion, based at least in part on a priority associated with the first set of semi-statically configured communications,
      wherein semi-statically configured communications that are quasi co-located (QCLed) with a unified beam have priority over other semi-statically configured communications that are not QCLed with the unified beam.

2. The UE of claim 1, wherein the first communication occasion of the first configuration overlaps with the second communication occasion of the second configuration based at least in part on one or more of:
   the first communication occasion and the second communication occasion completely overlapping in time,
   the first communication occasion and the second communication occasion partially overlapping in time,
   the first communication occasion and the second communication occasion completely overlapping in frequency, or
   the first communication occasion and the second communication occasion partially overlapping in frequency.

3. The UE of claim 1, wherein the first set of semi-statically configured communications or the second set of semi-statically configured communications is associated with:
   a configured grant for one or more uplink communications, or
   a semi-persistent scheduling configuration.

4. The UE of claim 1, wherein the one or more processors are further configured to:
   receive an indication of the unified beam for uplink and downlink communications,
      wherein the priority of the first set of semi-statically configured communications is based on whether the first set of semi-statically configured communications are QCLed or not QCLed with the unified beam.

5. The UE of claim 1, wherein the one or more processors are further configured to:
   receive an indication of a downlink control channel beam,
      wherein the priority of the first set of semi-statically configured communications is based on whether the first set of semi-statically configured communications are QCLed with the downlink control channel beam.

6. The UE of claim 1, wherein the one or more processors, to transmit or receive the communication, are configured to:
   transmit or receive the communication via the first communication occasion based on the priority and further based at least in part on:
      the first communication occasion being within a same communication protocol-based time unit from a downlink control channel monitoring occasion.

7. The UE of claim 1, wherein the priority assigned to the first set of semi-statically configured communications is further based at least in part on one or more of:
   a frequency range,
   a frequency band, or
   a subcarrier spacing.

8. The UE of claim 1, wherein the first communication occasion is associated with first quasi-co-location information, and
   wherein the second communication occasion is associated with second quasi-co-location information that is different from the first quasi-co-location information.

9. The UE of claim 1, wherein the first configuration indicates multiple transmission configuration information (TCI) states and associated transmission parameters, and wherein the priority assigned to the first set of semi-statically configured communications is further based at least in part on an active TCI state of the multiple TCI states.

10. The UE of claim 9, wherein the active TCI state is activated based at least in part on one or more of:
a time resource of the first communication occasion,
a frequency resource of the first communication occasion,
a modulation and coding scheme of the first communication occasion,
a resource size of the first communication occasion, or
a repetition number of the first communication occasion.

11. The UE of claim 10, wherein one or more of the modulation and coding scheme, the resource size, or the repetition number of the first communication occasion is based at least in part on one or more of:
previously transmit reports from the UE,
channel measurements,
signaling from a base station, or
an amount of time from activation of the active TCI state.

12. The UE of claim 9, wherein the active TCI state is activated based at least in part on one or more of:
group-common downlink control information (DCI),
UE-specific DCI,
one or more group-common medium access control (MAC) control elements (CEs), or
one or more UE-specific MAC CEs.

13. The UE of claim 9, wherein the active TCI state is activated based at least in part on one or more of:
an indication of a beam switching command associated with a control beam, or
a configured time pattern for switching between the multiple TCI states.

14. A network entity for wireless communication, comprising:
one or more memories; and
one or more processors, coupled to the one or more memories, configured to:
transmit, to a user equipment (UE), a first configuration for a first set of semi-statically configured communications;
transmit, to the UE, a second configuration for a second set of semi-statically configured communications, wherein a first communication occasion of the first configuration at least partially overlaps with a second communication occasion of the second configuration; and
receive or transmit a communication, via the first communication occasion or the second communication occasion, based at least in part on a priority associated with the first set of semi-statically configured communications,
wherein semi-statically configured communications that are quasi co-located (QCLed) with a unified beam have priority over other semi-statically configured communications that are not QCLed with the unified beam.

15. The network entity of claim 14, wherein the first communication occasion of the first configuration overlaps with the second communication occasion of the second configuration based at least in part on one or more of:
the first communication occasion and the second communication occasion completely overlapping in time,
the first communication occasion and the second communication occasion partially overlapping in time,
the first communication occasion and the second communication occasion completely overlapping in frequency, or
the first communication occasion and the second communication occasion partially overlapping in frequency.

16. The network entity of claim 14, wherein the first set of semi-statically configured communications or the second set of semi-statically configured communications is associated with:
a configured grant for one or more uplink communications, or
a semi-persistent scheduling configuration.

17. The network entity of claim 14, wherein the one or more processors are further configured to:
transmit an indication of the unified beam for uplink and downlink communications,
wherein the priority of the first set of semi-statically configured communications is based on whether the first set of semi-statically configured communications are QCLed or not QCLed with the unified beam.

18. The network entity of claim 14, wherein the one or more processors are further configured to:
transmit an indication of a downlink control channel beam,
wherein the priority of the first set of semi-statically configured communications is based on whether the first set of semi-statically configured communications are QCLed with the downlink control channel beam.

19. The network entity of claim 18, wherein the one or more processors, to receive or transmit the communication, are configured to:
receive or transmit the communication via the first communication occasion based on the priority and further based at least in part on:
the first communication occasion being within a same communication protocol-based time unit from a downlink control channel monitoring occasion.

20. The network entity of claim 14, wherein the priority is assigned further based at least in part on one or more of:
a frequency range of the first communication occasion and the second communication occasion,
a frequency band of the first communication occasion and the second communication occasion, or
a subcarrier spacing of the first communication occasion and the second communication occasion.

21. The network entity of claim 14, wherein the first communication occasion is associated with first quasi-co-location information, and
wherein the second communication occasion is associated with second quasi-co-location information that is different from the first quasi-co-location information.

22. The network entity of claim 14, wherein the first configuration indicates multiple transmission configuration information (TCI) states and associated transmission parameters, and
wherein the priority assigned to the first set of semi-statically configured communications is further based at least in part on an active TCI state of the multiple TCI states.

23. The network entity of claim 22, wherein the active TCI state is activated based at least in part on one or more of:
a time resource of the first communication occasion,
a frequency resource of the first communication occasion, a modulation and coding scheme of the first communication occasion, a resource size of the first communication occasion, or a repetition number of the first communication occasion.

24. The network entity of claim 23, wherein one or more of the modulation and coding scheme, the resource size, or the repetition number of the first communication occasion is based at least in part on one or more of:

previously transmit reports from the UE, channel measurements, signaling from the network entity, or an amount of time from activation of the active TCI state.

25. The network entity of claim 22, wherein the active TCI state is activated based at least in part on one or more of:

group-common downlink control information (DCI),

UE-specific DCI, one or more group-common medium access control (MAC) control elements (CEs), or one or more UE-specific MAC CEs.

26. The network entity of claim 22, wherein the active TCI state is activated based at least in part on one or more of:

an indication of a beam switching command associated with a control beam, or a configured time pattern for switching between the multiple TCI states.

27. A method of wireless communication performed by a user equipment (UE), comprising:

receiving a first configuration for a first set of semi-statically configured communications;

receiving a second configuration for a second set of semi-statically configured communications, wherein a first communication occasion of the first configuration at least partially overlaps with a second communication occasion of the second configuration; and transmitting or receiving a communication, via the first communication occasion or the second communication occasion, based at least in part on a priority associated with the first set of semi-statically configured communications, wherein semi-statically configured communications that are quasi co-located (QCLed) with a unified beam have priority over other semi-statically configured communications that are not QCLed with the unified beam.

28. The method of claim 27, wherein the first configuration indicates multiple transmission configuration information (TCI) states and associated transmission parameters, and wherein the priority assigned to the first set of semi-statically configured communications is further based at least in part on an active TCI state of the multiple TCI states.

29. A method of wireless communication performed by a network entity, comprising:

transmitting, to a user equipment (UE), a first configuration for a first set of semi-statically configured communications;

transmitting, to the UE, a second configuration for a second set of semi-statically configured communications, wherein a first communication occasion of the first configuration at least partially overlaps with a second communication occasion of the second configuration; and receiving or transmitting a communication, via the first communication occasion or the second communication occasion, based at least in part on a priority associated with the first set of semi-statically configured communications, wherein semi-statically configured communications that are quasi co-located (QCLed) with a unified beam have priority over other semi-statically configured communications that are not QCLed with the unified beam.

30. The method of claim 29, wherein the first configuration indicates multiple transmission configuration information (TCI) states and associated transmission parameters, and wherein the priority assigned to the first set of semi-statically configured communications is further based at least in part on an active TCI state of the multiple TCI states.

* * * * *